US008588478B2

(12) United States Patent
Makimoto et al.

(10) Patent No.: US 8,588,478 B2
(45) Date of Patent: Nov. 19, 2013

(54) BIOMETRIC AUTHENTICATION APPARATUS AND BIOMETRIC AUTHENTICATION METHOD

(75) Inventors: Eiji Makimoto, Nagoya (JP); Kunihiro Nomura, Kawasaki (JP); Yasuo Mizuno, Nagoya (JP); Noboru Takamura, Tokyo (JP); Hisao Ogata, Nagoya (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 371 days.

(21) Appl. No.: 12/905,644

(22) Filed: Oct. 15, 2010

(65) Prior Publication Data

US 2011/0129128 A1 Jun. 2, 2011

(30) Foreign Application Priority Data

Oct. 16, 2009 (JP) ................................. 2009-238889
Jun. 25, 2010 (JP) ................................. 2010-144809

(51) Int. Cl.
*G06K 9/00* (2006.01)
(52) U.S. Cl.
USPC .......................................... 382/116; 382/124
(58) Field of Classification Search
USPC ................................................. 382/116, 124
See application file for complete search history.

(56) References Cited

U.S. PATENT DOCUMENTS

| 5,828,773 | A * | 10/1998 | Setlak et al. ................... 382/126 |
| 6,400,836 | B2 * | 6/2002 | Senior ............................ 382/124 |
| 6,845,173 | B2 * | 1/2005 | Takahashi ....................... 382/124 |
| 6,912,299 | B1 * | 6/2005 | Hoshino ......................... 382/124 |
| 7,280,679 | B2 * | 10/2007 | Russo ............................ 382/124 |
| 7,672,488 | B2 * | 3/2010 | Miura et al. .................... 382/115 |
| 8,103,069 | B2 * | 1/2012 | Asano ............................ 382/128 |
| 8,310,372 | B2 * | 11/2012 | Kukula et al. .................. 340/665 |
| 2002/0048014 | A1 * | 4/2002 | Kono et al. ....................... 356/71 |
| 2004/0037016 | A1 | 2/2004 | Kaneko et al. |
| 2004/0184641 | A1 | 9/2004 | Nagasaka et al. |
| 2005/0171413 | A1 * | 8/2005 | Blair ............................. 600/310 |
| 2008/0112597 | A1 * | 5/2008 | Asano ............................ 382/115 |

FOREIGN PATENT DOCUMENTS

| CN | 1487400 A | 4/2004 |
| CN | 101408938 A | 4/2009 |
| JP | 2003-331268 | 11/2003 |
| JP | 2004-234040 | 8/2004 |

(Continued)

*Primary Examiner* — John Strege
(74) *Attorney, Agent, or Firm* — Foley & Lardner LLP

(57) ABSTRACT

A biometric authentication apparatus for performing user authentication based on finger/palm print information representing a biological characteristic of fingerprint or palm print and vein information representing a biological characteristic of vein, comprises:
  a finger/palm print information acquirer arranged and adapted to obtain finger/palm print information from a selected portion of a person;
  a vein information acquirer arranged and adapted to obtain vein information from the selected portion of the person;
  a sensor arranged and adapted to come in contact with the selected portion of the person and to output a signal corresponding to a pressing degree of the selected portion of the person against the sensor;
  a controller arranged and adapted to identify, responsive to the signal output from the sensor, whether a state of the selected portion of the person is suitable for obtaining the finger/palm print information and the vein information and to control the finger/palm print information acquirer and the vein information acquirer to obtain the finger/palm print information and the vein information according to a result of the identification; and
  a user authenticator arranged and adapted to perform user authentication based on the finger/palm print information and the vein information.

9 Claims, 15 Drawing Sheets

(56) References Cited

FOREIGN PATENT DOCUMENTS

| JP | 2004-259103 A | 9/2004 |
|---|---|---|
| JP | 2005-168627 | 6/2005 |
| JP | 2005-253989 A | 9/2005 |
| JP | 2006-277341 | 10/2006 |
| JP | 2006-285487 | 10/2006 |
| JP | 2006-288872 A | 10/2006 |
| JP | 2009-098935 | 5/2009 |

* cited by examiner

Fig.5

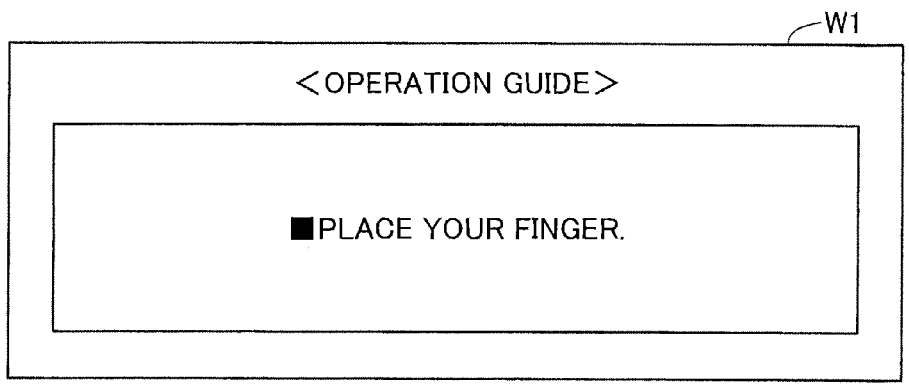

Fig.6

OUTPUT LEVEL OF FINGERTIP DETECTION SENSOR 104: F1

OUTPUT LEVEL OF FINGER BASE DETECTION SENSOR 105: F2

SENSOR OUTPUT LEVEL (3 LEVELS):
A (STRONG) > B (MEDIUM) > C (WEAK)

FINGERPRINT INFORMATION OBTAINABLE CONDITION: F1 =A

VEIN INFORMATION OBTAINABLE CONDITION: F1 =F2 =C

| SENSOR TYPE | | F2 (FINGER BASE) | | |
|---|---|---|---|---|
| | SENSOR OUTPUT LEVEL | A (STRONG) | B (MEDIUM) | C (WEAK) |
| F1 (FINGERTIP) | A (STRONG) | FINGERPRINT INFORMATION OBTAINABLE | | |
| | B (MEDIUM) | BIOLOGICAL INFORMATION UNOBTAINABLE DISPLAY OPERATION GUIDE WINDOW | | |
| | C (WEAK) | | | VEIN INFORMATION OBTAINABLE |

(F1=F2=C)

VEIN INFORMATION UNDER GENTLE PRESSURE (F1=F2=A)

VEIN INFORMATION UNDER
STRONG PRESSURE (F1=A、F2=C)

VEIN INFORMATION UNDER
STRONG PRESSURE

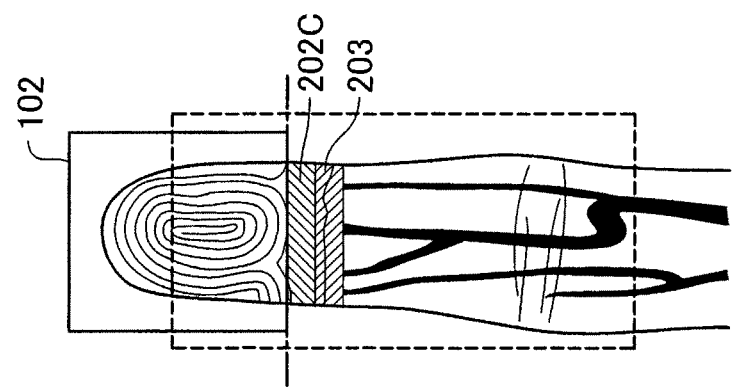
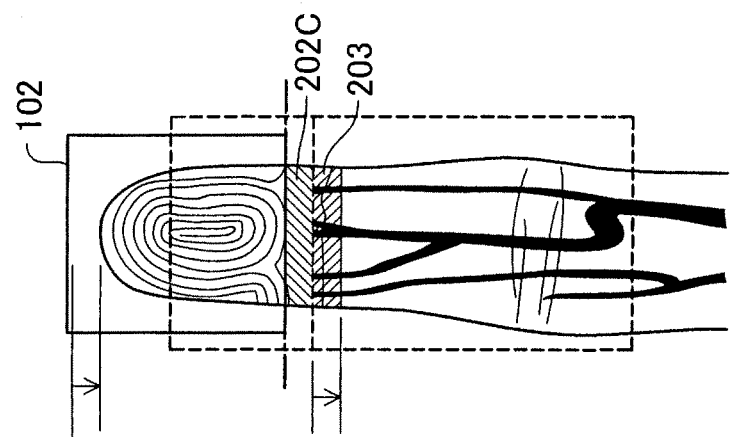
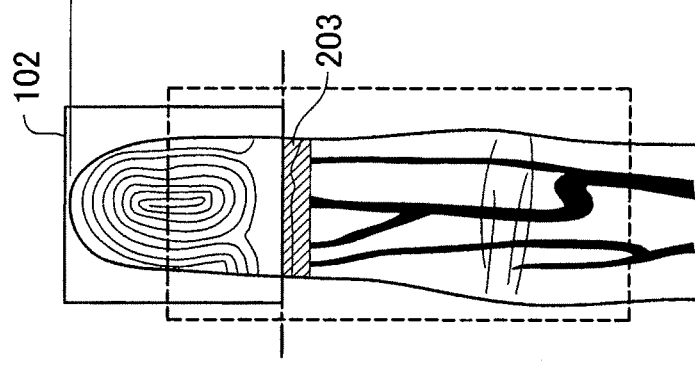

BIOMETRIC AUTHENTICATION APPARATUS AND BIOMETRIC AUTHENTICATION METHOD

CROSS REFERENCE TO RELATED APPLICATIONS

The present application claims priority from Japanese applications JP2009-238889 filed on Oct. 16, 2009 and JP2010-144809 filed on Jun. 25, 2010, the contents of which are hereby incorporated by reference into this application.

BACKGROUND OF INVENTION

1. Technical Field

The present invention relates to a biometric authentication apparatus used for user authentication based on finger/palm print information and vein information, as well as to a corresponding biometric authentication method.

2. Related Art

Multimodal biometric authentication techniques have been known and used for user authentication with multiple different types of biological information, such as fingerprint, facial recognition, and voice print. In relation to the multimodal biometric authentication techniques, one known technique uses one image sensor to obtain two different types of biological information (Unexamined Patent No. 2004-234040). Another known technique changes a light source for each type of biological information to be obtained (Unexamined Patent No. 2005-168627).

Acquisition of information with higher accuracy has been demanded in the process of obtaining finger/palm print information representing a biological characteristic of fingerprint or palm print and vein information representing a biological characteristic of vein from a user. There has also been a demand in society for the technique of readily verifying whether obtained biological information is a living biological origin or a non-living non-biological origin.

SUMMARY OF THE INVENTION

By taking into account the issue discussed above, there is a requirement for assuring acquisition of finger/palm print information and vein information with high accuracy in a biometric authentication apparatus. There is also a requirement for readily verifying whether obtained biological information is a living biological origin or a non-living non-biological origin.

In order to address at least part of the requirements described above, the present invention provides various embodiments and aspects described below.

Aspect 1:

A biometric authentication apparatus for performing user authentication based on finger/palm print information representing a biological characteristic of fingerprint or palm print and vein information representing a biological characteristic of vein, comprising:

a finger/palm print information acquirer arranged and adapted to obtain finger/palm print information from a selected portion of a person;

a vein information acquirer arranged and adapted to obtain vein information from the selected portion of the person;

a sensor arranged and adapted to come in contact with the selected portion of the person and to output a signal corresponding to a pressing degree of the selected portion of the person against the sensor;

a controller arranged and adapted to identify, responsive to the signal output from the sensor, whether a state of the selected portion of the person is suitable for obtaining the finger/palm print information and the vein information and to control the finger/palm print information acquirer and the vein information acquirer to obtain the finger/palm print information and the vein information according to a result of the identification; and a user authenticator arranged and adapted to perform user authentication based on the finger/palm print information and the vein information.

In the biometric authentication apparatus of this aspect, the controller identifies whether the state of the selected portion is suitable for obtaining the finger/palm print information and the vein information. The finger/palm print information acquirer and the vein information acquirer are controlled to obtain the finger/palm print information and the vein information according to a result of the identification by the controller. This arrangement desirably assures acquisition of the finger/palm print information and the vein information with high accuracy.

Aspect 2:

The biometric authentication apparatus in accordance with aspect 1, wherein the controller identifies that the state of the selected portion of the person is suitable for obtaining the finger/palm print information when the pressing degree of the selected portion of the person is higher than a predetermined level, while identifying that the state of the selected portion of the person is suitable for obtaining first vein information when the pressing degree of the selected portion of the person is not higher than the predetermined level.

The biometric authentication apparatus of this aspect obtains the finger/palm print information from the selected portion in the state that the pressing degree is higher than the predetermined level, while obtaining the vein information from the selected portion in the state that the pressing degree is not higher than the predetermined level. This arrangement assures acquisition of the finger/palm print information and the vein information with the higher accuracy.

Aspect 3:

The biometric authentication apparatus in accordance with aspect 2, wherein the controller identifies that the state of the selected portion of the person is suitable for obtaining second vein information when the pressing degree of the selected portion of the person is higher than the predetermined level.

The biometric authentication apparatus of this aspect readily verifies whether the first vein information and the second vein information are obtained from a non-living non-biological origin or from a living biological origin by referring to the obtained second vein information.

Aspect 4:

The biometric authentication apparatus in accordance with aspect 3, wherein the controller compares the first vein information with the second vein information and thereby verifies whether the selected portion of the person, from which the first vein information and the second vein information are obtained, is a living biological origin or a non-living or non-biological origin.

The biometric authentication apparatus of this aspect compares the first vein information with the second vein information and readily verifies whether the selected portion from which the first vein information and the second vein information are obtained is a non-living non-biological origin or a living biological origin.

Aspect 5:

The biometric authentication apparatus in accordance with aspect 1, further comprising:

a notifier arranged and adapted to inform a user of an operation guide, wherein upon identification that the state of the selected portion of the person is not suitable for obtaining the finger/palm print information or the vein information, the controller controls the notifier to inform the user of an operation guide for changing the state of the selected portion of the person to be suitable for obtaining the finger/palm print information or the vein information.

The biometric authentication apparatus of this aspect informs the user of the operation guide for changing the state of the selected portion to be suitable for obtaining the finger/palm print information or the vein information. This arrangement further assures acquisition of the finger/palm print information and the vein information with the higher accuracy.

Aspect 6:

A biometric authentication method of performing user authentication with a biometric authentication apparatus having a finger/palm print information acquirer arranged and adapted to obtain finger/palm print information representing a biological characteristic of fingerprint or palm print from a selected portion of a person and a vein information acquirer arranged and adapted to obtain vein information representing a biological characteristic of vein from the selected portion, the biometric authentication method comprising:

outputting a signal corresponding to a pressing degree of a selected portion of a person;

identifying whether a state of the selected portion is suitable for obtaining the finger/palm print information and the vein information based on the output signal and controlling the finger/palm print information acquirer and the vein information acquirer to obtain the finger/palm print information and the vein information according to a result of the identification; and performing user authentication based on the finger/palm print information and the vein information.

Aspect 7:

The biometric authentication apparatus in accordance with aspect 1, wherein the finger/palm print information acquirer has a mounting surface on which the selected portion of the person is placed, the vein information acquirer has a first zone arranged to have a step relative to the mounting surface of the finger/palm print information acquirer and a second zone arranged at an identical height with a height of the mounting surface, while the selected portion of the person is stationary on the mounting surface of the finger/palm print information acquirer, the vein information acquirer obtains first vein information in the first zone and second vein information in an adjacent area close to a boundary between the first zone and the second zone, as the vein information, and the user authenticator performs a first verification process of verifying the selected portion of the person as a living biological origin when the first vein information is clear and distinct and the second vein information is unclear and obscure, while verifying the selected portion of the person as a non-living or non-biological origin when the first vein information and the second vein information are both clear and distinct.

The biometric authentication apparatus of this aspect verifies whether the selected portion is a living biological origin or a non-living non-biological artificial origin, based on the clearness of the second vein information. This arrangement effectively prevents fraud authentication using an artificial substance.

Aspect 8:

The biometric authentication apparatus in accordance with aspect 7, wherein the vein information acquirer obtains both the first vein information and the second vein information from the selected portion of the person located at a first position on the mounting surface and from the selected portion of the person located at a second position apart from the first position by at least a predetermined distance on the mounting surface, the user authenticator performs a second verification process even when the selected portion of the person is verified as a living biological origin in the first verification process, and the second verification process performed by the user authenticator verifies the selected portion of the person as a living biological origin when the second vein information obtained at the first position is unclear and obscure and when a specific part of the first vein information obtained at the second position, which corresponds to a specific area of the selected portion of the person from which the second vein information is obtained at the first position, is clear and distinct, the second verification process verifying the selected portion of the person as a non-living or non-biological origin when the second vein information obtained at the first position is unclear and obscure and when the specific part of the first vein information obtained at the second position, which corresponds to the specific area of the selected portion of the person from which the second vein information is obtained at the first position, is unclear and obscure.

When the selected portion is a living biological origin, a change of the pressing area with a change of the position where the selected portion is located leads to a variation in amount of blood flow running through the selected portion and changes the detected vein information. When the second vein information obtained at the first position is equal to the specific part of the first vein information obtained at the second position, this means no variation in amount of blood flow running through the selected portion. Even in the case of highly sophisticated imitation of the selected portion created for the purpose of deceiving the verification of the biological authenticity based on the second vein information, the biometric authentication apparatus of this embodiment can accurately verify that the selected portion is a non-living or non-biological origin.

Aspect 9:

The biometric authentication apparatus in accordance with either one of aspects 7 and 8, wherein the vein information acquirer changes a size of the adjacent area close to the boundary between the first zone and the second zone for obtaining the second vein information with a variation in level of the output signal from the sensor, such that the adjacent area is extended to be wider with an increase in pressing degree of the selected portion of the person.

The smooth blood flow running through the selected portion is more highly interrupted under a greater pressure of the selected portion. The biometric authentication apparatus of this aspect changes the size of the second zone according to the pressing degree of the selected portion and thereby readily verifies whether the selected portion is a living biological origin or a non-living non-biological origin.

The invention may be actualized by any of diverse applications, embodiments, and arrangements other than those described above, for example, a biometric authentication method, computer programs for implementing the functions of either the biometric authentication method or the biometric authentication apparatus, and recording media in which such computer programs are recorded. The biometric authentication apparatus of the invention may be used in combination with one or multiple other appropriate members.

BRIEF DESCRIPTION OF THE DRAWINGS

FIG. 5 is an explanatory diagrammatic representation of an exemplary operation guide window displayed on the touch panel.

FIG. 6 is an explanatory diagrammatic representation of a correlation of image generation by the finger/palm print information acquisition unit 102 and the vein information acquisition unit to the outputs of the fingertip detection sensor and the finger base detection sensor.

FIG. 20A shows biological information obtained at a first position.

FIGS. 20B and 20C show biological information obtained at a second position.

DESCRIPTION OF THE PREFERRED EMBODIMENTS

Apparatuses and methods of practicing the present invention are described below with reference to the accompanied drawings, which should help to clarify the invention in its various embodiments.

A. First Embodiment

A1. General Structure

Figure 1:
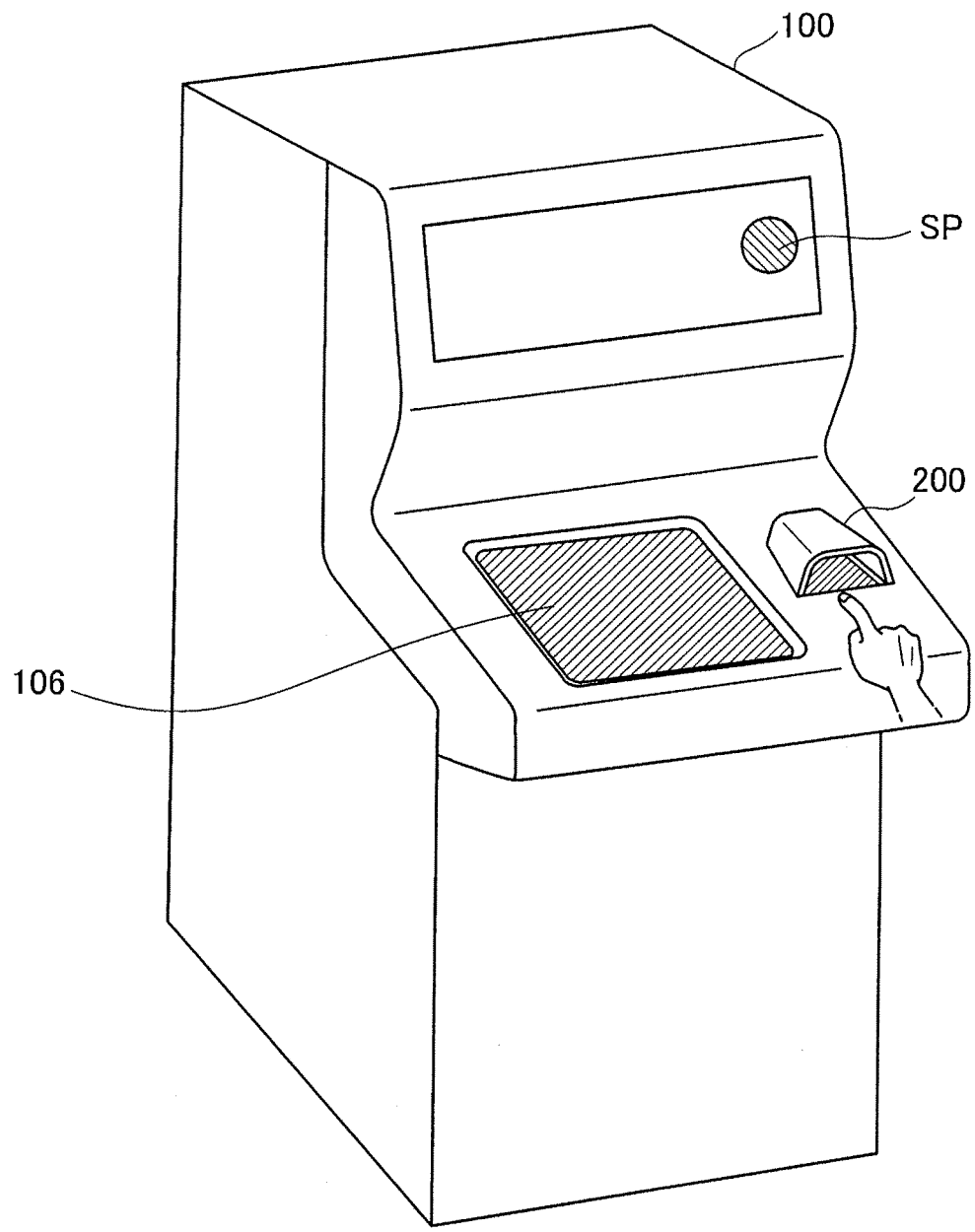
FIG. 1 is an explanatory diagrammatic representation of the appearance of an automated teller machine or ATM provided with a biometric authentication apparatus according to a preferred embodiment of the present invention.

FIG. 1 is an explanatory diagrammatic representation of the appearance of an automated teller machine or ATM 100 provided with a biometric authentication apparatus according to a preferred embodiment of the present invention. The ATM 100 includes a touch panel 106, a biological information acquisition assembly 200 structured as one embodiment of the biometric authentication apparatus, and a speaker SP. The touch panel 106 is operable to display menu windows and operation guide windows and to receive and accept the user's touch entries.

The biological information acquisition assembly 200 includes a finger/palm print information acquisition unit 102 and a vein information acquisition unit 130, which will be described later with reference to FIG. 2. The biological information acquisition assembly 200 captures a hand or a finger placed therein to generate a hand or finger image and extracts, from the generated image, biological information, i.e., vein information representing the biological characteristics of the veins and finger/palm print information representing the biological characteristics of the fingerprint or the palm print. For example, the vein information and the finger/palm print information may be given as a vein pattern and a fingerprint or palm print (hereafter may be referred to as finger/palm print) pattern. In another example, the vein information and the finger/palm print information may be given as information regarding the positions of characteristic points set at locations having some characteristics in the vein pattern and in the finger/palm print pattern. In still another example, the vein information and the finger/palm print information may be given as information regarding characteristic amounts or the amounts of some characteristics in the veins and in the finger/palm print. The vein information and the finger/palm print information further include a generated image of the veins and the finger/palm print. The preferred embodiment is described below in detail with a finger vein pattern and a fingerprint pattern as a typical example of the vein information and the finger/palm print information.

The speaker SP gives voice output of operation guides for the ATM 100. At least one of the touch panel 106 and the speaker SP in the embodiment corresponds to the 'notifier' in the claims of the invention.

In the ATM 100, the user authentication is performed for each user who desires a financial transaction, for example, a cash withdrawal or a transfer. More specifically, when the user places a hand or a finger in the biological information acquisition assembly 200 according to an operation guide window displayed on the touch panel 106, the biological information acquisition assembly 200 operates to extract vein information and finger/palm print information from a generated image of the user's captured hand or finger. The user is successfully authenticated on verification of a match between the extracted vein information and finger/palm print information and the user's pre-registered vein information and finger/palm print information. The user is then allowed to proceed to a desired financial transaction, such as a cash withdrawal or a transfer.

Figure 2:
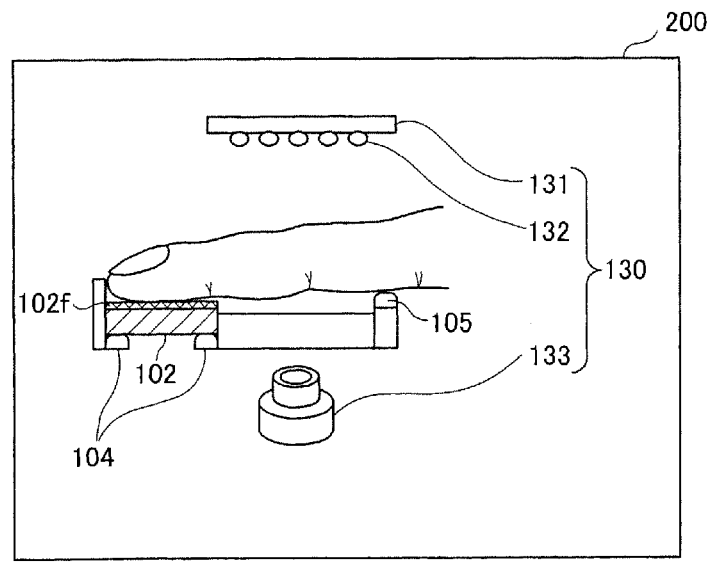
FIG. 2 is an explanatory diagrammatic representation of the structure of the biological information acquisition assembly.

FIG. 2 is an explanatory diagrammatic representation of the structure of the biological information acquisition assembly 200, which includes a finger/palm print information acquisition unit 102, a vein information acquisition unit 130, a fingertip detection sensor 104, and a finger base detection sensor 105. In this embodiment, the finger/palm print information acquisition unit 102 captures fingerprint on a finger to generate an image of fingerprint (hereafter may be referred to as 'fingerprint image'). Alternatively the finger/palm print information acquisition unit 102 may capture palm print on a hand to generate an image of palm print, although this is not described in detail here. More specifically in this embodiment, the finger/palm print information acquisition unit 102 has a protective film 102f and generates a fingerprint image based on the friction ridges of the finger that are in contact with the protective film 102f. In this embodiment, the finger/palm print information acquisition unit 102 adopts a semiconductor system using multiple electrodes located under a protective film 102f and generates a fingerprint image based on variations of electric charges at the respective electrodes induced by pressing the friction ridges of the finger against the protective film. The fingerprint image may be generated by any of various systems other than this semiconductor system. One alternative system is an optical system that includes a light source unit of emitting light to irradiate the finger and an image sensor of converting the varying amounts of the received light (or the amounts of shading caused by the fingerprint) into electric charges. In the optical system, the image sensor receives reflection from the finger or fingerprint irradiated with light emitted from the light source unit and generates a fingerprint image. The finger/palm print information acquisition unit 102 extracts fingerprint information from the generated fingerprint image. The fingerprint information may be extracted by any of known techniques.

The vein information acquisition unit 130 captures veins in a finger to generate an image of the veins (hereafter simply referred to as 'vein image'). More specifically, the vein information acquisition unit 130 has a finger irradiating light source unit 131 provided with near infrared LEDs 132 and an infrared camera 133. The near infrared LEDs 132 are located above a hand or a finger placed in the biological information acquisition assembly 200 to irradiate the hand or the finger with near infrared rays. The infrared camera 133 is located below the hand or the finger placed in the biological information acquisition assembly 200 to receive the near infrared rays emitted from the near infrared LEDs 132 and transmitted through the hand or the finger and to generate a vein image corresponding to the amounts of the received rays (or the amounts of shading caused by the veins). The vein information acquisition unit 130 extracts vein information from the generated vein image. The vein information may be extracted by any of known techniques.

The fingertip detection sensor 104 is located at a position below and in contact with the finger/palm print information acquisition unit 102 to detect a pressing degree by a fingertip and to output a signal corresponding to the detected pressing degree. The finger base detection sensor 105 is located at a position in contact with a base of finger or a finger base to detect a pressing degree by the finger base and to output a signal corresponding to the detected pressing degree. Here the signal is not restricted to a digital signal representing the pressing degree but may be an analog signal or a voltage level increasing with an increase in pressing degree. In this embodiment, the signal is given as a voltage level. The fingertip detection sensor 104 and the finger base detection sensor 105 are designed to have greater outputs corresponding to the greater pressing degree.

In this embodiment, the fingertip detection sensor 104 is located below the finger/palm print information acquisition unit 102. The position of the fingertip detection sensor 104 is not limited to the location below the finger/palm print information acquisition unit 102 but may be any other suitable location. For example, the fingertip detection sensor 104 may be located adjacent to the finger/palm print information acquisition unit 102 to be in direct contact with the fingertip. In this embodiment, the fingertip detection sensor 104 and the finger base detection sensor 105 receives a pressing force of the fingertip or the finger base and outputs a signal based on the received pressing force. As long as a signal corresponding to the pressing degree by a finger can be output, the output signal is not necessarily based on the received pressing force. In one alternative embodiment, the output signal may be based on the position or the height of the finger pressed down corresponding to the pressing degree or may be based on the degree of color change of the finger corresponding to the pressing degree.

In another embodiment, the output signal may be based on a pressing-induced variation in amount or density of vein characteristic in a finger, which is measured as a variation in number of specific pixels recognized as veins from a vein image generated by the vein information acquisition unit 130. In still another embodiment, the output signal may be based on the measurement of a specific quantity or density in a vein characteristic amount extracted and generated for matching from a vein image generated by the vein information acquisition unit 130. In a further embodiment, when the storage in a biological information storage unit 113 (discussed later with reference to FIG. 3) includes only one piece of corresponding registered biological information as vein information corresponding to certain ID information, a biometric authentication matching module 111 (discussed later with reference to FIG. 3) matches the vein characteristic amount to the corresponding registered biological information. The output signal corresponding to the pressing degree may be based on a matching score or matching rate given as a result of the matching. It is reasonably assumed that the corresponding registered biological information is obtained at an adequate pressing degree. A greater differential from the corresponding registered biological information is accordingly expected at a higher pressing degree of obscuring a vein pattern. This results in lowering the matching rate and giving a poor matching score. The output signal corresponding to the pressing degree can thus be based on the matching score.

Figure 3:
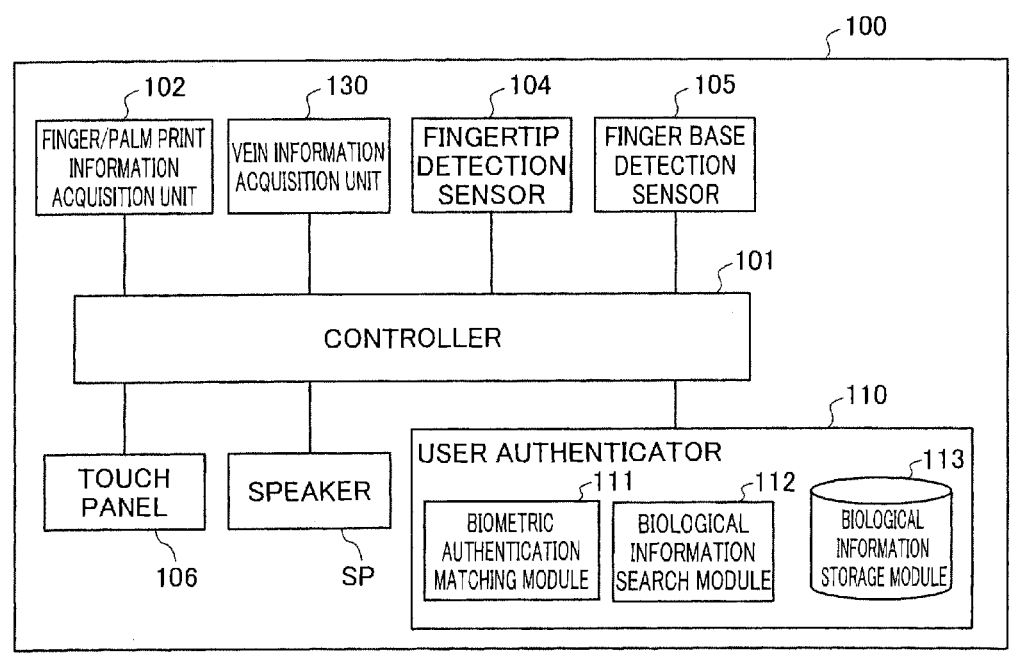
FIG. 3 is a block diagrammatic illustration of the internal structure of the ATM 100.

FIG. 3 is a block diagrammatic illustration of the internal structure of the ATM 100. The ATM 100 includes a user authenticator 110 and a controller 101, in addition to the finger/palm print information acquisition unit 102, the vein information acquisition unit 130, the fingertip detection sensor 104, the finger base detection sensor 105, the touch panel 106, and the speaker SP described above. The user authenticator 110 includes a biometric authentication matching module 111, a biological information search module 112, and a biological information storage module 113. The biological information storage module 113 has storage of fingerprint information and vein information registered in advance for each account user. The biological information search module 112 controls the biological information storage module 113 and retrieves fingerprint information and vein information corresponding to ID information entered by the user from the biological information storage module 113. The biometric authentication matching module 111 authenticates the user by matching fingerprint information and vein information respectively obtained by the finger/palm print information acquisition unit 102 and the vein information acquisition unit 130 to the fingerprint information and the vein information retrieved by the biological information search module 112.

The controller 101 includes a CPU and memories (not shown) and is interconnected via a bus with the finger/palm print information acquisition unit 102, the vein information acquisition unit 130, the fingertip detection sensor 104, the finger base detection sensor 105, the touch panel 106, and the user authenticator 110. The controller 101 controls the operations of the whole ATM 100 and processes various data. The CPU of the controller 101 executes a program stored in the memory to perform a user authentication process discussed later. In this embodiment, the controller 101 is actualized by the software configuration where the CPU executes the program. The controller 101 may alternatively be actualized by a hardware component, such as an integrated circuit. In addition to the various components described above, the ATM 100 may further has a cash deposit/withdrawal mechanism structured to receive bills and coins inserted into the ATM 100 by the user and store the received bills and coins into vaults (not shown) within the ATM 100 and to take bills and coins out of the vaults in response to the user's request, a card/passbook processing mechanism structured to read an account number from the user's cash card inserted into the ATM 100 and to update the record of financial transactions on the user's passbook inserted into the ATM 100, and an interface arranged to connect the ATM 100 to a network.

A2. User Authentication Process

Figure 4:
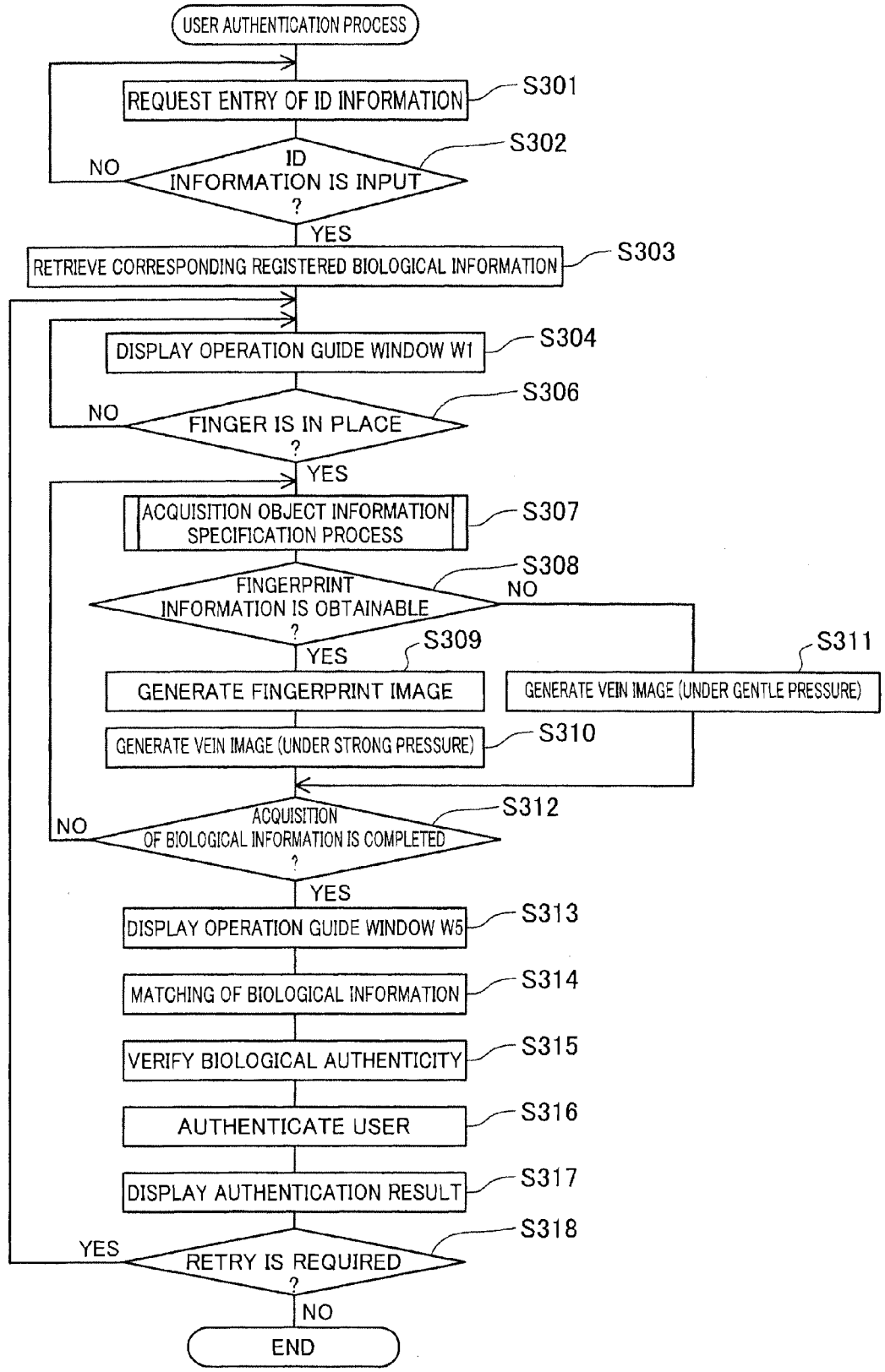
FIG. 4 is a flowchart showing a user authentication process performed in the ATM.

FIG. 4 is a flowchart showing a user authentication process performed in the ATM 100. When the user desiring a cash withdrawal selects a withdrawal option in a menu window displayed on the touch panel 106, the user authentication process starts in the ATM 100. The controller 101 first requests the user to enter ID information (step S301). More specifically, the controller 101 displays an operation guide window to request the user's entry of ID information on the touch panel 106 at step S301. A voice operation guide to request the user's entry of ID information may be output from the speaker SP, instead of or in addition to the display of the operation guide window on the touch panel 106. The user's entry of the ID information is not essential but the ID information may be obtained by any other suitable method. For example, the controller 101 may obtain the ID information from the user's cash card inserted into the ATM 100.

The controller 101 subsequently determines whether the ID information is input (step S302). When it is determined at step S302 that the ID information is input, the controller 101 retrieves fingerprint information and vein information corresponding to the input ID information (hereafter may be referred to as 'corresponding registered biological information') from the biological information storage module 113 (step S303).

The controller 101 then requests the user to place a finger in the biological information acquisition assembly 200 (step S304). FIG. 5 is an explanatory diagrammatic representation of an exemplary operation guide window displayed on the touch panel 106. In this embodiment, the controller 101 displays an operation guide window W1 on the touch panel 106 to request the user to place a finger in the biological information acquisition assembly 200. A voice operation guide to request the user's placement of a finger in the biological information acquisition assembly 200 may be output from the speaker SP, instead of or in addition to the display of the operation guide window on the touch panel 106.

The controller 101 subsequently detects whether the user places a finger in the biological information acquisition assembly 200 (step S306). In response to detection of a finger placed in the biological information acquisition assembly 200 at step S306, the controller 101 performs an acquisition object information specification process (step S307). The acquisition object information specification process selects biological information to be obtained as an acquisition object according to the state of the finger placed in the biological information acquisition assembly 200. More specifically, the acquisition object information specification process determines whether the state of the finger placed in the biological information acquisition assembly 200 is suitable for obtaining fingerprint information or vein information, based on output signals from the fingertip detection sensor 104 and the finger base detection sensor 105.

FIG. 6 is an explanatory diagrammatic representation of a correlation of image generation by the finger/palm print information acquisition unit 102 and the vein information acquisition unit 130 to the outputs of the fingertip detection sensor 104 and the finger base detection sensor 105. The outputs of the fingertip detection sensor 104 and the finger base detection sensor 105 are classified into three output levels (strong, medium, and weak). When an output G of a detection sensor and four threshold values L1, L2, L3, and L4 (L1>L2>L3>L4) satisfy a relation of $L1 > G \geq L2$, the output level of the detection sensor is specified as a level A (strong). In a relation of $L2 > G \geq L3$, the output level is specified as a level B (medium). In a relation of $L3 > G \geq L4$, the output level is specified as a level C (weak). An output level of the fingertip detection sensor 104 and an output level of the finger base detection sensor 105 are respectively expressed by F1 and F2. In this embodiment, when the output G of the fingertip detection sensor 104 has the relation of $L1 > G \geq L2$, the output level F1 of the fingertip detection sensor 104 is specified as the level A, which may simply be expressed as 'F1=A'. The fingertip detection sensor 104 and the finger base detection sensor 105 may adopt identical threshold values or different threshold values. The terminology of 'a predetermined value' in the claims of the invention represents a pressing degree of a fingertip in a specific range where the output level of a fingertip detection sensor is the level B.

When the output levels of the fingertip detection sensor 104 and the finger base detection sensor 105 respectively satisfy preset conditions, the controller 101 determines that the state of the finger is suitable for obtaining either the fingerprint information or the vein information. Namely the controller 101 identifies that the state of the finger allows for acquisition of either the fingerprint information or the vein information, based on the combination of the output levels of the fingertip detection sensor 104 and the finger base detection sensor 105.

More specifically, fingerprint information is obtained when the output level F1 of the fingertip detection sensor 104 is the level A (F1=A). This is because the state of strongly pressing a fingertip against the finger/palm print information acquisition unit 102 is desirable for capturing and generating a clear fingerprint image. The generation of the clear fingerprint image assures extraction of fingerprint information with high accuracy.

Vein information is obtained when both the output level F1 of the fingertip detection sensor 104 and the output level F2 of the finger base detection sensor 105 are the level C (F1=F2=C). This is because the state of non-obstruction of the blood flow in the finger is desirable for capturing and generating a distinct vein image. The image generation of the veins utilizes the characteristic that hemoglobin in the blood absorbs near infrared rays. In the strongly pressing state of the fingertip or the finger base, the smooth blood flow is interrupted, so that a clear vein image including a distinct vein pattern is not obtainable. The generation of the clear vein image assures extraction of vein information with high accuracy.

Figure 7:
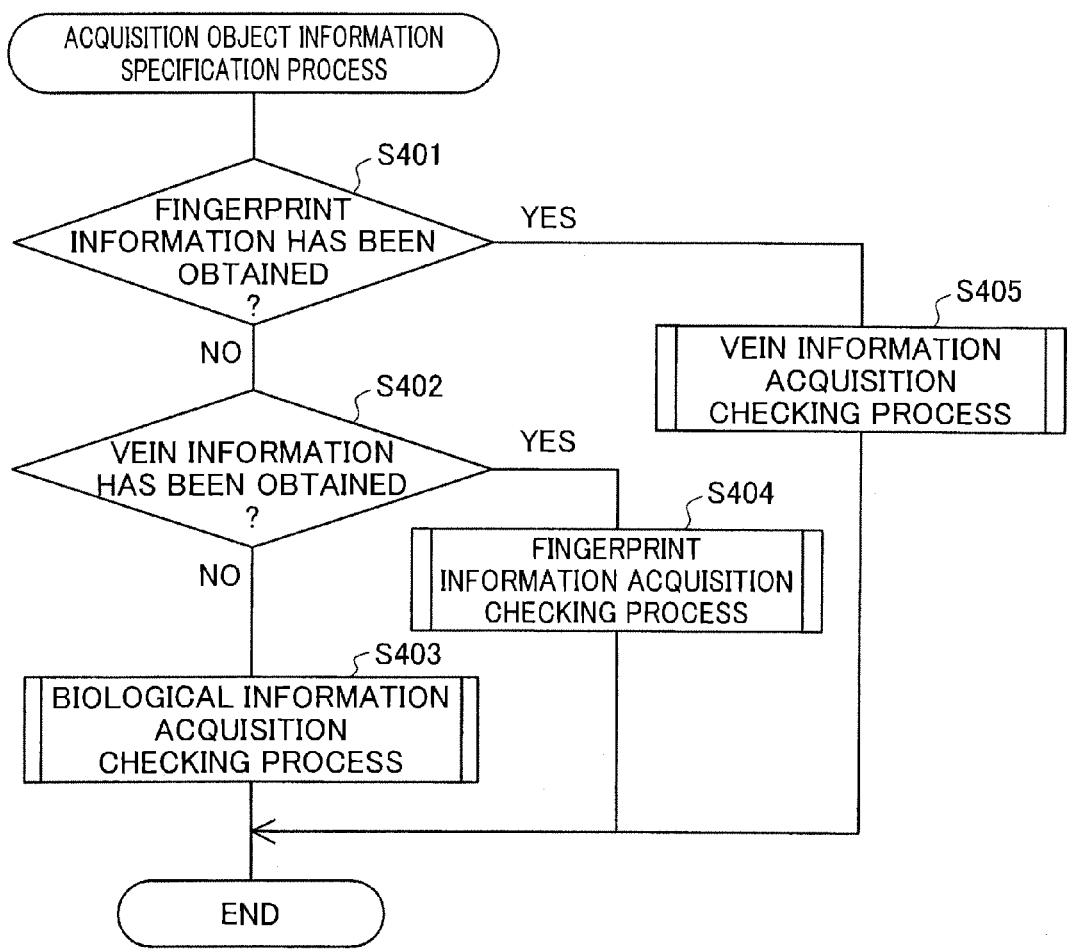
FIG. 7 is a flowchart showing the details of the acquisition object information specification process.

A concrete procedure of the acquisition object information specification process is described. FIG. 7 is a flowchart showing the details of the acquisition object information specification process performed at step S307 in the user authentication process of FIG. 4. The controller 101 determines whether fingerprint information has already been obtained with regard to a hand or finger placed in the biological information acquisition assembly 200 (step S401). When it is determined that the fingerprint information has not yet been obtained (step S401: No), the controller 101 subsequently determines whether vein information has already been obtained with regard to the hand or finger placed in the biological information acquisition assembly 200 (step S402). When it is determined that the vein information has not yet been obtained (step S402: No), the controller 101 performs a biological information acquisition checking process (step S403). The biological information acquisition checking process identifies whether the state of the finger placed in the biological information acquisition assembly 200 is suitable for obtaining either the fingerprint information or the vein information.

Figure 8:
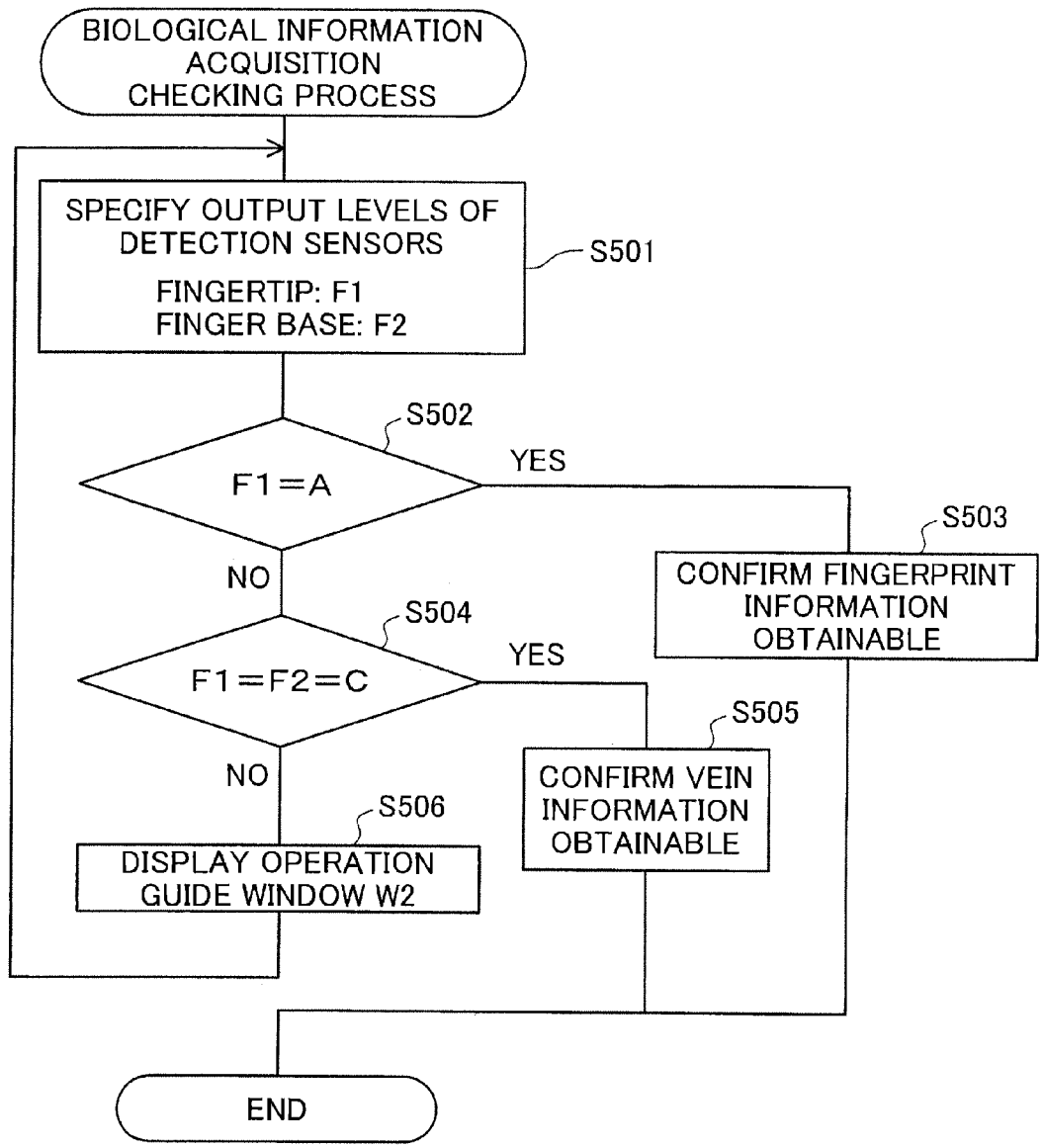
FIG. 8 is a flowchart showing the details of the biological information acquisition checking process.

FIG. 8 is a flowchart showing the details of the biological information acquisition checking process performed at step S403 in the acquisition object information specification process of FIG. 7. The controller 101 specifies the output levels of the respective detection sensors 104 and 105 (step S501). More specifically, the output levels are specified from the outputs of both the fingertip detection sensor 104 and the finger base detection sensor 105. The controller 101 identifies whether the output level F1 of the fingertip detection sensor 104 is the level A (step S502). When the output level F1 is the level A (step S502: Yes), the controller 101 confirms that the fingerprint information is obtainable (step S503). Such confirmation is hereafter referred to as 'confirmation of fingerprint information obtainable'. After the confirmation of the fingerprint information obtainable, the biological information acquisition checking process is terminated.

When the output level F1 is not the level A (step S502: No), on the other hand, the controller 101 subsequently identifies whether both the output level F1 of the fingertip detection sensor 104 and the output level F2 of the finger base detection sensor 105 are the level C (step S504). When both the output levels F1 and F2 are the level C (step S504: Yes), the controller 101 confirms that the vein information is obtainable (step S505). Such confirmation is hereafter referred to as 'confirmation of vein information obtainable'. After the confirmation of the vein information obtainable, the biological information acquisition checking process is terminated.

Figure 9:
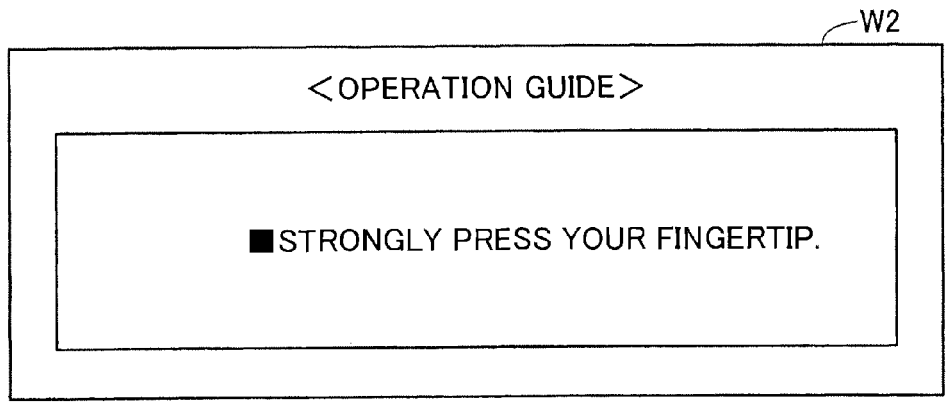
FIG. 9 is an explanatory diagrammatic representation of an exemplary operation guide window displayed on the touch panel.

When both of the output levels F1 and F2 are not the level C (step S504: No), on the other hand, the controller 101 requests the user to strongly press a fingertip against the biological information acquisition assembly 200 (step S506). FIG. 9 is an explanatory diagrammatic representation of an exemplary operation guide window displayed on the touch panel 106. The controller 101 displays an operation guide window W2 on the touch panel 106 to request the user to strongly press a fingertip against the biological information acquisition assembly 200. A voice operation guide to request the user's strong press of a fingertip against the biological information acquisition assembly 200 may be output from the speaker SP, instead of or in addition to the display of the operation guide window on the touch panel 106. After the request for the user to strongly press a fingertip against the biological information acquisition assembly 200, the controller 101 returns the processing flow to step S501 to specify the output levels of the detection sensors 104 and 105 again. The biological information acquisition checking process is performed in this manner.

Referring back to the flowchart of FIG. 7, when the vein information has already been obtained (step S402: Yes), the controller 101 performs a fingerprint information acquisition checking process (step S404). The fingerprint information acquisition checking process identifies whether the state of a finger placed in the biological information acquisition assembly 200 is suitable for obtaining the fingerprint information.

Figure 10:
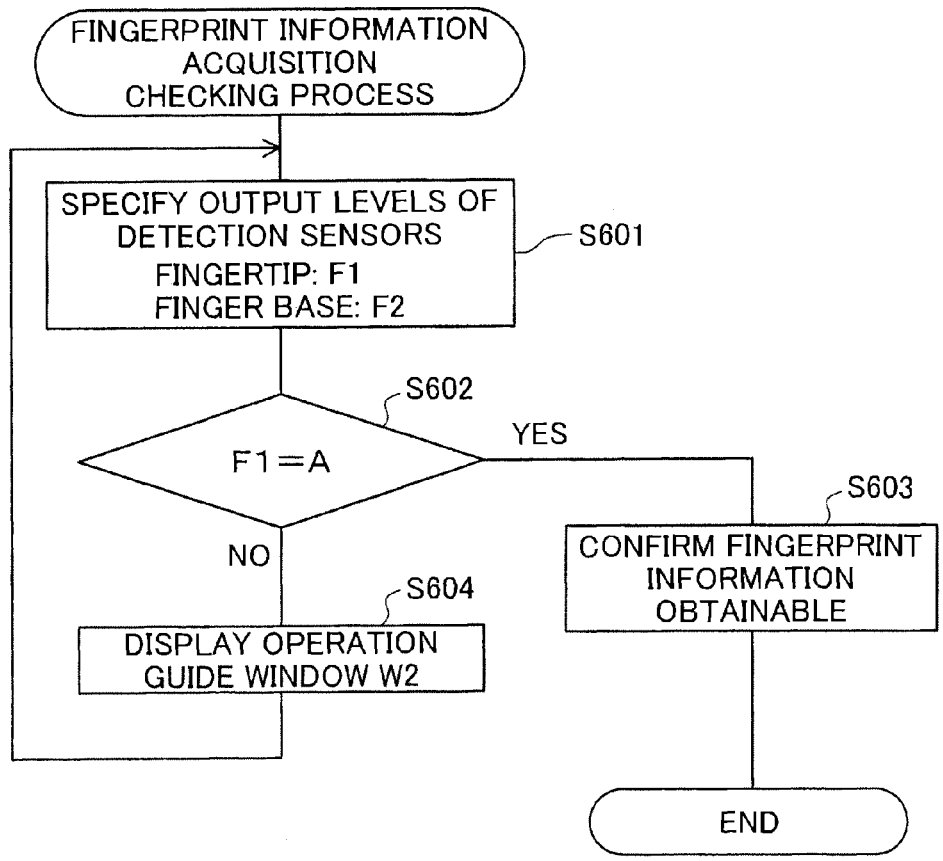
FIG. 10 is a flowchart showing the details of the fingerprint information acquisition checking process.

FIG. 10 is a flowchart showing the details of the fingerprint information acquisition checking process performed at step S404 in the acquisition object information specification process of FIG. 7. The controller 101 specifies the output levels of the respective detection sensors 104 and 105 (step S601). More specifically, the output levels are specified from the outputs of both the fingertip detection sensor 104 and the finger base detection sensor 105. The controller 101 identifies whether the output level F1 of the fingertip detection sensor 104 is the level A (step S602). When the output level F1 is the level A (step S602: Yes), the controller 101 confirms that the fingerprint information is obtainable (step S603). After the confirmation of the fingerprint information obtainable, the fingerprint information acquisition checking process is terminated.

When the output level F1 is not the level A (step S602: No), on the other hand, the controller 101 requests the user to strongly press a fingertip against the biological information acquisition assembly 200 (step S604). The controller 101 displays the operation guide window W2 shown in FIG. 9 on the touch panel 106 to request the user to strongly press a fingertip against the biological information acquisition assembly 200. In this case, a voice operation guide to request the user's strong press of a fingertip against the biological information acquisition assembly 200 may also be output from the speaker SP, instead of or in addition to the display of the operation guide window on the touch panel 106. After the request for the user to strongly press a fingertip against the biological information acquisition assembly 200, the controller 101 returns the processing flow to step S601 to specify the output levels of the detection sensors 104 and 105 again. The fingerprint information acquisition checking process is performed in this manner.

Referring back to FIG. 7, when the fingerprint information has already been obtained (step S401: Yes), the controller 101 performs a vein information acquisition checking process (step S405). The vein information acquisition checking process identifies whether the state of a finger placed in the biological information acquisition assembly 200 is suitable for obtaining the vein information.

Figure 11:
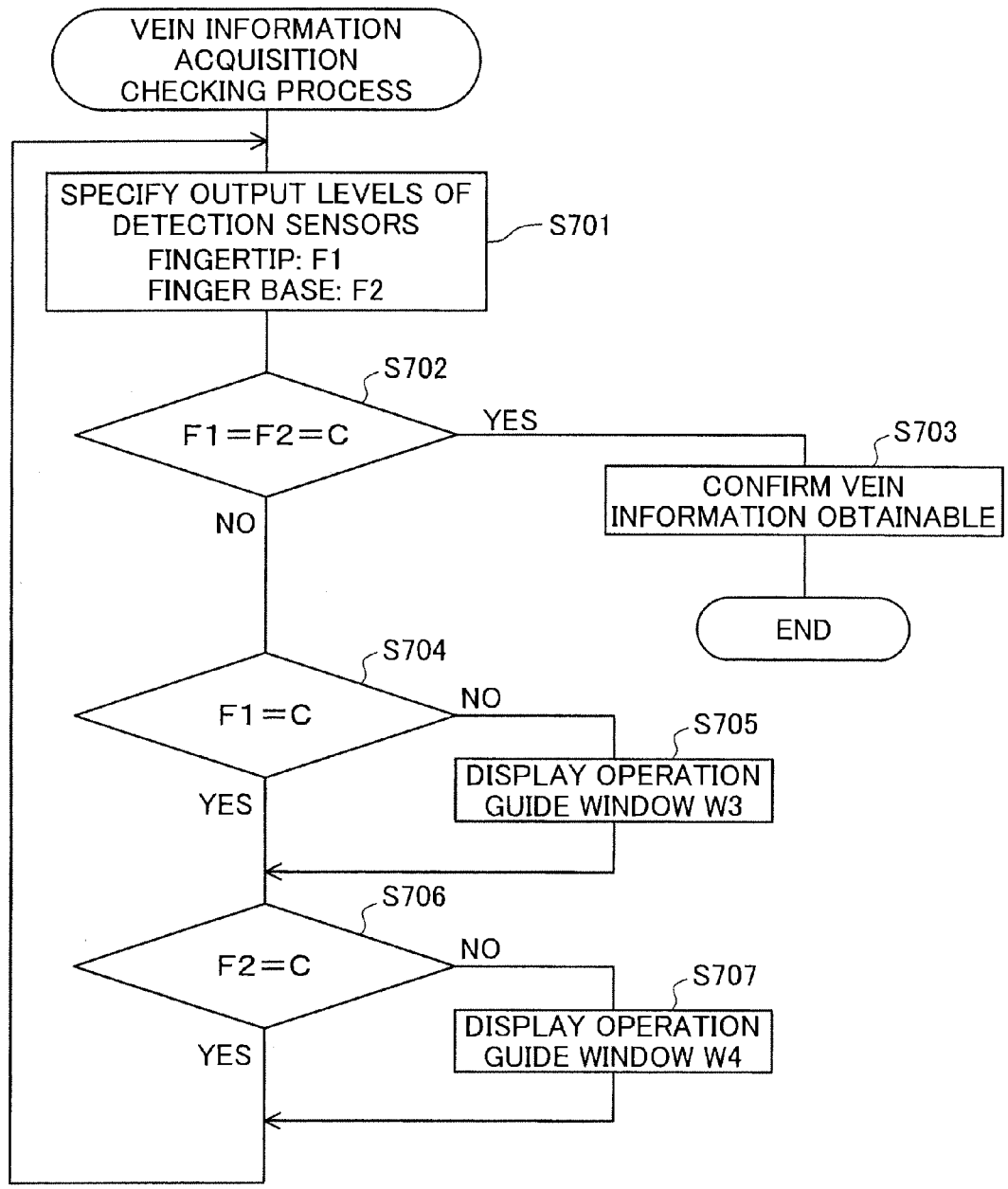
FIG. 11 is a flowchart showing the details of the vein information acquisition checking process.

FIG. 11 is a flowchart showing the details of the vein information acquisition checking process performed at step S405 in the acquisition object information specification process of FIG. 7. The controller 101 specifies the output levels of the respective detection sensors 104 and 105 (step S701). More specifically, the output levels are specified from the outputs of both the fingertip detection sensor 104 and the finger base detection sensor 105. The controller 101 identifies whether both the output level F1 of the fingertip detection sensor 104 and the output level F2 of the finger base detection sensor 105 are the level C (step S702). When both the output levels F1 and F2 are the level C (step 702: Yes), the controller 101 confirms that the vein information is obtainable (step S703). After the confirmation of the vein information obtainable, the vein information acquisition checking process is terminated.

Figure 12:
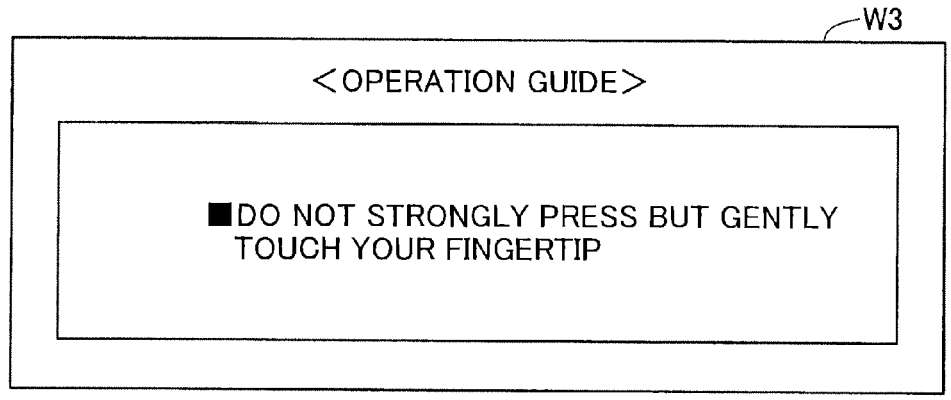
FIG. 12 is an explanatory diagrammatic representation of an exemplary operation guide window displayed on the touch panel.

When both of the output levels F1 and F2 are not the level C (step S702: No), on the other hand, the controller 101 subsequently identifies whether the output level F1 is the level C (step S704). When the output level F1 is not the level C (step S704: No), the controller 101 requests the user to gently touch a fingertip to the biological information acquisition assembly 200 (step S705). FIG. 12 is an explanatory diagrammatic representation of an exemplary operation guide window displayed on the touch panel 106. The controller 101 displays an operation guide window W3 on the touch panel 106 to request the user to gently touch a fingertip to the biological information acquisition assembly 200. A voice operation guide to request the user's gentle touch of a fingertip to the biological information acquisition assembly 200 may be output from the speaker SP, instead of or in addition to the display of the operation guide window on the touch panel 106. After the request for the user to gently touch a fingertip to the biological information acquisition assembly 200, the controller 101 identifies whether the output level F2 is the level C (step S706). When the output level F1 is the level C (step S704: Yes), the processing flow also goes to step S706 to identify whether the output level F2 is the level C.

Figure 13:
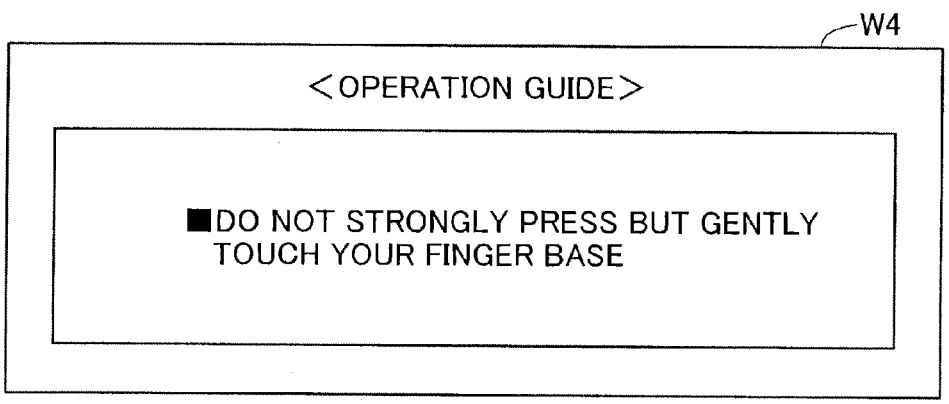
FIG. 13 is an explanatory diagrammatic representation of an exemplary operation guide window displayed on the touch panel.

When the output level F2 is not the level C (step S706: No), the controller 101 requests the user to gently touch a finger base to the biological information acquisition assembly 200 (step S707). FIG. 13 is an explanatory diagrammatic representation of an exemplary operation guide window displayed on the touch panel 106. The controller 101 displays an operation guide window W4 on the touch panel 106 to request the user to gently touch a finger base to the biological information acquisition assembly 200. A voice operation guide to request the user's gentle touch of a finger base to the biological information acquisition assembly 200 may be output from the speaker SP, instead of or in addition to the display of the operation guide window on the touch panel 106. After the request for the user to gently touch a finger base to the biological information acquisition assembly 200, the controller 101 returns the processing flow to step S701 to specify the output levels of the detection sensors 104 and 105 again. When the output level F2 is the level C (step S706: Yes), the processing flow also returns to step S701. The vein information acquisition checking process is performed in this manner. In the course of the acquisition object information specification process including the biological information acquisition checking process, the fingerprint information acquisition checking process, and the vein information acquisition checking process, the controller 101 confirms either the fingerprint information obtainable or the vein information obtainable.

Referring back to FIG. 4, when the result of the acquisition object information specification process confirms the fingerprint information obtainable (step S308: Yes), the controller 101 captures fingerprint on the finger (step S309). More specifically, the controller 101 captures the fingerprint on the finger to generate a fingerprint image and extracts fingerprint information from the generated fingerprint image at step S309. The controller 101 also captures veins in the finger (step S310). More specifically, the controller 101 captures the veins in the finger to generate a vein image and extracts vein information from the generated vein image at step S310. The vein information obtained at step S310 is extracted from the vein image generated in the strongly pressing state of the fingertip (F1=A) and is hereafter referred to as 'vein information under strong pressure'. The vein information under strong pressure is used in biological authenticity verification discussed later and corresponds to the 'second vein information' in the claims of the invention.

When the acquisition object information specification process does not confirm the fingerprint information obtainable (step S308: No), this means that the process confirms the vein information obtainable. In this case, the controller 101 captures the veins in the finger (step S311). More specifically, the controller 101 captures the veins in the finger to generate a vein image and extracts vein information from the generated vein image at step S311. The vein information obtained at step S311 is extracted from the vein image generated in the non-pressing state of either the fingertip or the finger base or in the gently pressing state of both the fingertip and the finger base (F1=F2=C) and is hereafter referred to as 'vein information under gentle pressure'. The vein information under gentle pressure corresponds to the 'first vein information' in the claims of the invention.

Figure 14:
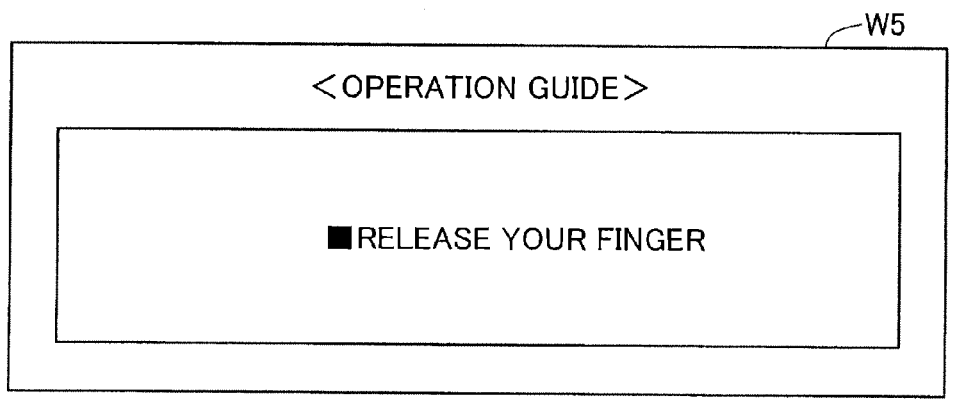
FIG. 14 is an explanatory diagrammatic representation of an exemplary operation guide window displayed on the touch panel.

The controller 101 repeats the processing of steps S307 to S311 (step S312: No) until obtaining both the fingerprint information and the vein information. When both the fingerprint information and the vein information are obtained (step S312: Yes), the controller 101 requests the user to release a finger from the biological information acquisition assembly 200 (step S313). FIG. 14 is an explanatory diagrammatic representation of an exemplary operation guide window displayed on the touch panel 106. The controller 101 displays an operation guide window W5 on the touch panel 106 to request the user to release a finger from the biological information acquisition assembly 200. A voice operation guide to request the user's release of a finger from the biological information acquisition assembly 200 may be output from the speaker SP, instead of or in addition to the display of the operation guide window on the touch panel 106.

After the request for the user to release a finger from the biological information acquisition assembly 200, the controller 101 matches the fingerprint information extracted at step S309 and the vein information extracted at step S311 to the corresponding registered biological information retrieved at step S303 (step S314). More specifically, the controller 101 compares the fingerprint information extracted at step S309 with the fingerprint information retrieved as part of the corresponding registered biological information at step S303, while comparing the vein information extracted at step S311 with the vein information retrieved as another part of the corresponding registered biological information at step S303. A method adopted for matching extracts characteristic points from a vein pattern included in the extracted vein information and from a fingerprint pattern included in the extracted fingerprint information, computes a matching score from distances or differences between the extracted characteristic points and the pre-registered characteristic points as the corresponding registered biological information, and determines whether the computed matching score is higher or not higher than a preset reference value.

The matching score of not higher than the preset reference value means that there is a high matching rate between the extracted fingerprint information and vein information and the retrieved fingerprint information and vein information as the corresponding registered biological information. The matching score of the characteristic points may alternatively be computed from differences between characteristic amounts, such as pixel values, in the fingerprint pattern and in the vein pattern and characteristic amounts included in the corresponding registered biological information, instead of from the distances or differences between the characteristic points.

After the matching of the extracted fingerprint information and vein information to the corresponding registered biological information, the controller 101 verifies the biological authenticity of the finger (step S315). The verification of the biological authenticity verifies whether the finger captured to generate the fingerprint image and the vein image used for extraction of the fingerprint information and the vein information is a living finger. More specifically, the controller 101 compares the vein information under strong pressure extracted at step S310 with the vein information under gentle pressure extracted at step S311 and verifies whether the finger captured for extraction of the fingerprint information and the vein information is a living finger or a non-living finger at step S315. The living finger is defined to have the flow of blood. A non-artificial but biological finger cut off from the living body has no flow of blood and is thus not regarded as the living finger.

Figure 15:
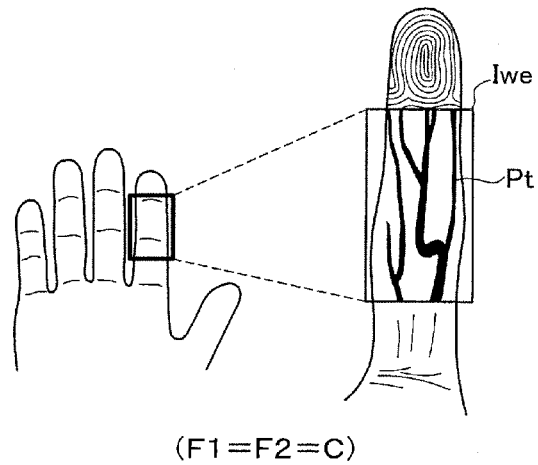
FIG. 15 is an explanatory diagrammatic representation of one example of the vein information under gentle pressure.
Figure 16A:
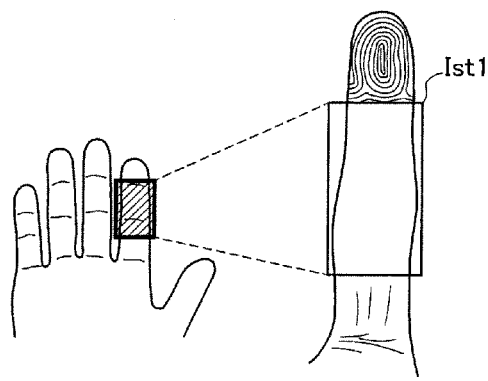
FIG. 16A is explanatory diagrammatic representation of one example of the vein information under strong pressure.
Figure 16B:
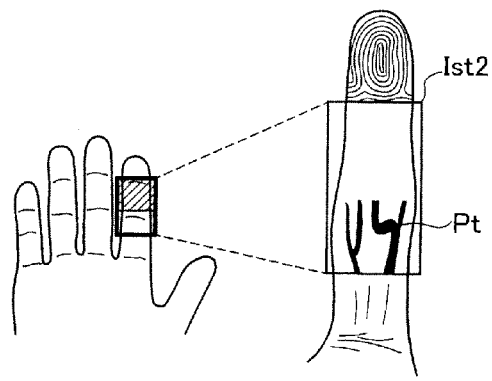
FIG. 16B is explanatory diagrammatic representation of one example of the vein information under strong pressure.

FIG. 15 is an explanatory diagrammatic representation of one example of the vein information under gentle pressure. FIG. 16A is an explanatory diagrammatic representation of one example of the vein information under strong pressure. FIG. 16B is an explanatory diagrammatic representation of one example of the vein information under strong pressure. Vein information under gentle pressure Iwe is obtained from a vein image generated on the condition that both the output level F1 of the fingertip detection sensor 104 and the output level F2 of the finger base detection sensor 105 are the level C (F1=F2=C). Namely the vein image is generated in the state of non-obstruction of the blood flow in the finger. The vein information under gentle pressure Iwe accordingly has a distinct vein pattern Pt as shown in FIG. 15.

The vein information under strong pressure is, on the other hand, obtained from a vein image generated on the condition that the output level F1 of the fingertip detection sensor 104 is the level A (F1=A). Namely the vein image is generated in the state of obstruction of the blood flow in the fingertip. Vein information under strong pressure Ist1 obtained from a vein image in the state of obstruction of the blood flow in the finger base has no vein pattern or an obscure vein pattern as shown in FIG. 16A. Vein information under strong pressure Ist2 obtained from a vein image in the state of non-obstruction of the blood flow in the finger base has a vein pattern Pt with obscurity in the fingertip as shown in FIG. 16B.

The controller 101 compares the vein pattern included in the vein information under gentle pressure with the vein pattern included in the vein information under strong pressure and verifies whether the finger captured for extraction of the fingerprint information and the vein information is a living finger. One concrete procedure extracts characteristic amounts from the vein pattern included in the vein information under gentle pressure and from the vein pattern included in the vein information under strong pressure, computes a matching score from a difference between the extracted characteristic amounts, and determines whether the computed matching score is higher or not higher than a preset reference value. The characteristic amount may be, for example, a pixel value of the vein pattern.

The living finger has a variation in state of blood flow with a variation in pressing state of the finger. When the captured finger is a living finger, there is a difference between the characteristic amount of the vein pattern included in the vein information under gentle pressure and the characteristic amount of the vein pattern included in the vein information under strong pressure. When the captured finger is not a living finger, on the contrary, some object apparently regarded as veins uniformly appears in a generated image, irrespective of the variation in pressing state of the finger. There is accordingly no difference between the characteristic amount of the vein pattern included in the vein information under gentle pressure and the characteristic amount of the vein pattern included in the vein information under strong pressure. The matching score computed from the difference between the characteristic amount of the vein pattern included in the vein information under gentle pressure and the characteristic amount of the vein pattern included in the vein information under strong pressure thus gives a higher value for a living finger than a value for a non-living finger. The controller 101 verifies the captured finger having the matching score of higher than the preset reference value as a living finger, while verifying the captured finger having the matching score of not higher than the preset reference value as a non-living finger. This method allows for easy verification of the captured finger as a living finger or non-living finger.

As in the matching performed at step S314 (FIG. 4), a matching score computed from distances or differences between characteristic points in the two vein patterns may be adopted for the verification of the captured finger as a living finger or non-living finger. A matching score computed from a difference between the characteristic amount of the vein pattern included in the vein information under strong pressure and the characteristic amount of the corresponding registered biological information may be adopted for the verification of the captured finger as a living finger or non-living finger. The living finger has a color change on the finger surface with a variation in pressing state of the finger. By taking into account this feature, a matching score computed from a difference between a pixel value of a finger surface image generated in the pressing state of the finger and a pixel value of a finger surface image generated in the non-pressing state of the finger may also be adopted for the verification of the captured finger as a living finger or non-living finger.

Referring back to FIG. 4, the controller 101 authenticates the user (step S316). More specifically, the controller 101 refers to the result of matching at step S314 and the result of verification at step S315 for the user authentication at step S316. When the computed matching score is not higher than the preset reference value at step S314 and when the captured finger is verified as the living finger at step S315, the controller 101 authenticates the person with the finger placed in the biological information acquisition assembly 200 as an authorized user corresponding to the input ID information. When the fingerprint information and the vein information obtained by the biological information acquisition assembly 200 has a high matching rate with the pre-registered fingerprint information and vein information corresponding to the input ID information and when the finger placed in the biological information acquisition assembly 200 is verified as a living finger, there is an extremely low probability that any person other than the authorized user impersonates the authorized user to make a financial transaction.

The controller 101 subsequently displays the result of the user authentication (step S317). Upon successful user authentication, the controller 101 gives a display showing successful user authentication on the touch panel 106 and allows the authenticated user to proceed to the desired financial transaction, such as the cash withdrawal or the transfer. Upon failed user authentication, on the other hand, the controller 101 gives a display showing failed user authentication, as well as a 'retry' button for retry of user authentication and a 'cancel' button for cancellation of the financial transaction on the touch panel 106. In response to the user's selection of the 'retry' button (step S318: Yes), the controller 101 returns the processing flow to step S304 to request the user to place a finger in the biological information acquisition assembly 200.

In response to the user's selection of the 'cancel' button (step S318: No), on the other hand, the controller 101 terminates the user authentication process and cancels the financial transaction.

As described above, in the ATM 100 of the first embodiment, the controller 101 refers to the output signals of the detection sensors 104 and 105 varying with a variation in pressing state of the finger and identifies whether the state of the finger placed in the biological information acquisition assembly 200 is suitable for obtaining the fingerprint information or the vein information. The finger/palm print information acquisition unit 102 and the vein information acquisition unit 130 respectively obtain the fingerprint information and the vein information according to the result of the identification by the controller 101. This procedure assures acquisition of the fingerprint information and the vein information with high accuracy. The accuracy of the fingerprint information and the accuracy of the vein information depend upon a variation in pressing state of the finger captured for generation of a fingerprint image and for generation of a vein image. The procedure thus identifies whether the pressing state of the finger is suitable for generation of a fingerprint image or generation of a vein image and generates a fingerprint image and a vein image in the respective suitable pressing states of the finger. This arrangement assures extraction of the fingerprint information and the vein information with high accuracy.

In the ATM 100 of the first embodiment, when the pressing state of the finger represents a higher level or strong level (F1=A), the controller 101 identifies that the state of the finger is suitable for obtaining the fingerprint information. When the pressing state of the finger represents a lower level or weak level (F1=F2=C), the controller 101 identifies that the state of the finger is suitable for obtaining the vein information. This procedure assures acquisition of the fingerprint information and the vein information with high accuracy. It is desirable to capture fingerprint and generate a fingerprint image in the state that the friction ridges of the fingerprint are strongly pressed against the finger/palm print information acquisition unit 102. A fingerprint image generated in the strongly pressing state of the fingertip has a distinct fingerprint pattern. This arrangement thus assures extraction of the fingerprint information with high accuracy.

It is desirable to capture veins and generate a vein image in the state that neither of the fingertip nor the finger base is strongly pressed. The image generation of the veins utilizes the characteristic that hemoglobin in the blood absorbs near infrared rays. In the strongly pressing state of the fingertip or the finger base, the smooth blood flow is interrupted, so that a clear vein image including a distinct a vein pattern is not obtainable. A vein image generated in the non-pressing or gently pressing state of the fingertip and the finger base has a distinct vein pattern. This arrangement thus assures extraction of the vein information with high accuracy.

In the ATM 100 of the first embodiment, the controller 101 compares the vein information under gentle pressure with the vein information under strong pressure and thereby readily verifies whether the finger captured for extraction of the vein information or the fingerprint information is a living finger. The living finger has a variation in state of blood flow with a variation in pressing state of the finger. When the captured finger is a living finger, there is a difference between the characteristic amount of the vein pattern included in the vein information under gentle pressure and the characteristic amount of the vein pattern included in the vein information under strong pressure. When the captured finger is not a living finger, on the contrary, some object apparently regarded as veins uniformly appears in a generated image, irrespective of the variation in pressing state of the finger. There is accordingly no difference between the characteristic amount of the vein pattern included in the vein information under gentle pressure and the characteristic amount of the vein pattern included in the vein information under strong pressure. The procedure computes a matching score from the difference between the characteristic amount of the vein pattern included in the vein information under gentle pressure and the characteristic amount of the vein pattern included in the vein information under strong pressure and compares the computed matching score with a preset reference value to verify whether the finger captured for extraction of the vein information or the fingerprint information is a living finger.

In the ATM 100 of the first embodiment, when it is identified that the state of the finger is not suitable for obtaining the fingerprint information or the vein information, the controller 101 controls the touch panel 106 or the speaker SP to give an operation guide for requesting the user to change the state of the finger to be suitable for obtaining the fingerprint information or the vein information. This procedure assures acquisition of the fingerprint information and the vein information with high accuracy. More specifically, when it is identified that the state of the finger is not suitable for obtaining the fingerprint information or the vein information, the controller 101 displays an operation guide window as shown in FIG. 9, 12, or 13 on the touch panel 106 and request the user to change the state of the finger. This arrangement enables a fingerprint image and a vein image to be generated in the respectively adequate pressing states of the finger. Alternatively or additionally a voice operation guide may be given by the speaker SP, so that the speaker SP has the similar effects to those of the touch panel 106.

B. Other Aspects

The invention is not limited to the embodiment and its applications discussed above but may be actualized in diversity of other embodiments and applications within the scope of the invention. Some examples of possible modification are given below.

B1. Modification 1

The ATM 100 of the above embodiment has the biological information search module 112 and the biological information storage module 113. One modification may omit the biological information search module 112 and the biological information storage module 113 from the design of the ATM 100. For example, a host computer (not shown) connected with the ATM 100 via a network may be structured to have the biological information search module 112 and the biological information storage module 113. In response to a request from the ATM 100, the host computer sends the corresponding registered biological information to the ATM 100. This modified arrangement allows for the similar series of processing to those described in the above embodiment.

B2. Modification 2

The procedure of the above embodiment obtains the finger/palm print information and the vein information from the user's finger. One modification may cause the finger/palm print information and the vein information to be obtained from the user's any suitable site other than the finger. For example, the finger/palm print information and the vein information may be obtained from the user's palm or sole. In another example, the finger/palm print information and the vein information may be obtained from the user's different sites; for example, the finger/palm print information from the user's finger and the vein information from the user's palm.

B3. Modification 3

The ATM 100 of the above embodiment has the touch panel 106. One modification may omit the touch panel 106 from the design of the ATM 100 that is provided with an input unit like buttons and an output unit like the speaker SP to allow for the user's financial transactions. The ATM 100 of the above embodiment has the speaker SP. One modification may omit the speaker SP from the design of the ATM 100 that is provided with an output unit like the touch panel 106.

B4. Modification 4

The user authentication process performed in the ATM 100 of the above embodiment includes verification of the biological authenticity. The verification of the biological authenticity may be omitted from the user authentication process. One modified procedure of the user authentication process without verification of the biological authenticity authenticates the user based on only the result of matching at step S314. This modified procedure does not require acquisition of the vein information under strong pressure.

B5. Modification 5

The user authentication process of the embodiment obtains the fingerprint information at the output level F1 equal to the level A and the vein information at the output levels F1 and F2 equal to the level C. Any of various other conditions may be arbitrarily set for acquisition of the fingerprint information and the vein information. For example, the fingerprint information may be obtained at the output level F1 equal to either the level A or the level B. The vein information may be obtained at the output level F1 equal to the level B. As shown in FIG. 6, in the above embodiment, the outputs from the fingertip detection sensor 104 and the finger base detection sensor 105 are classified into three levels. The number of levels is, however, not restricted to three but may be any suitable number other than three, for example, four levels or two levels.

In the embodiment described above, when the output G of the detection sensor satisfies the relation of $L1 > G \geq L2$, the output level is specified as the level A (strong). When the output G satisfies the relation of $L3 > G \geq L4$, the output level is specified as the level C (weak). In one modification, the output level may be specified as the level A when the output G satisfies a relation of $G \geq L2$ without an upper limit. Similarly the output level may be specified as the level C when the output G satisfies a relation of $L3 > G$ without a lower limit.

C. Second Embodiment

Figure 17:
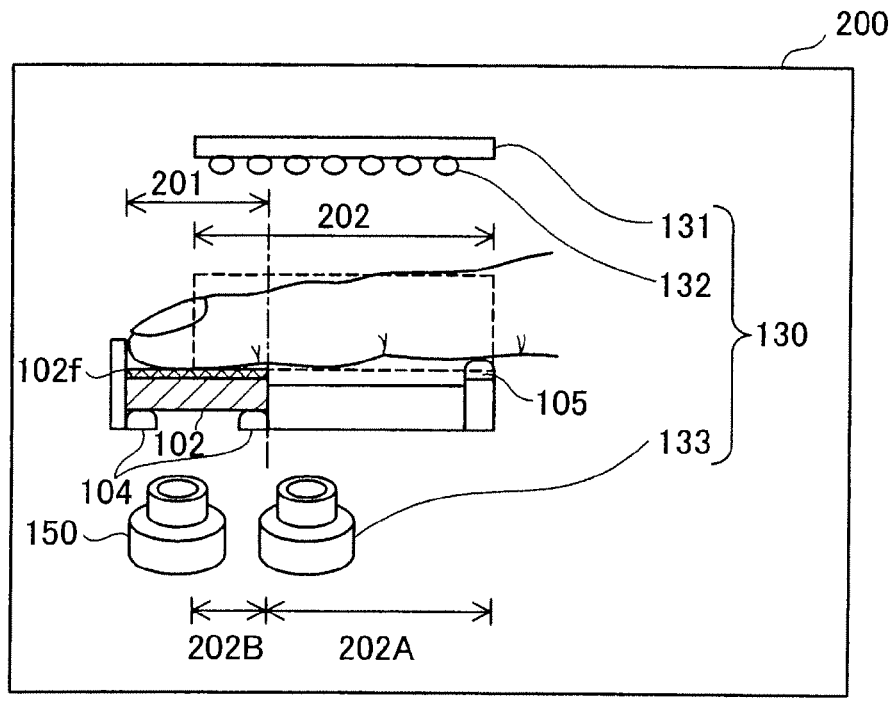
FIG. 17 is an explanatory diagrammatic representation of the structure of a biometric authentication apparatus according to a second embodiment of the invention.

FIG. 17 is an explanatory diagrammatic representation of the structure of a biometric authentication apparatus according to a second embodiment of the invention. The structure of the biometric authentication apparatus of the second embodiment is basically similar to the structure of the first embodiment shown in FIG. 2, except the following differences. In the biological information acquisition assembly 200 structured as the biometric authentication apparatus of the second embodiment, a finger/palm print information acquisition zone 201 has a camera 150 located to detect the color of a finger that is in contact with a protective film 102f. Compared with the structure of the first embodiment, the structure of the second embodiment has a wider range of a vein information acquisition zone 202, which is set for acquisition of vein information by a vein information acquisition unit 130 and partly overlaps the finger/palm print information acquisition zone 201. A non-overlap area of the vein information acquisition zone 202 that does not overlap the finger/palm print information acquisition zone 201 is specified as a first area 202A. The remaining overlap area of the vein information acquisition zone 202 is specified as a second area 202B. The structure of the first embodiment does not obtain vein information from the second area 202B. Although not being specifically explained in the first embodiment, there is a step between the finger/palm print information acquisition zone 201 and the first area 202A. Namely the finger is not in contact with the first area 202A, and there is a space between the finger and the first area 202A.

Figure 18:
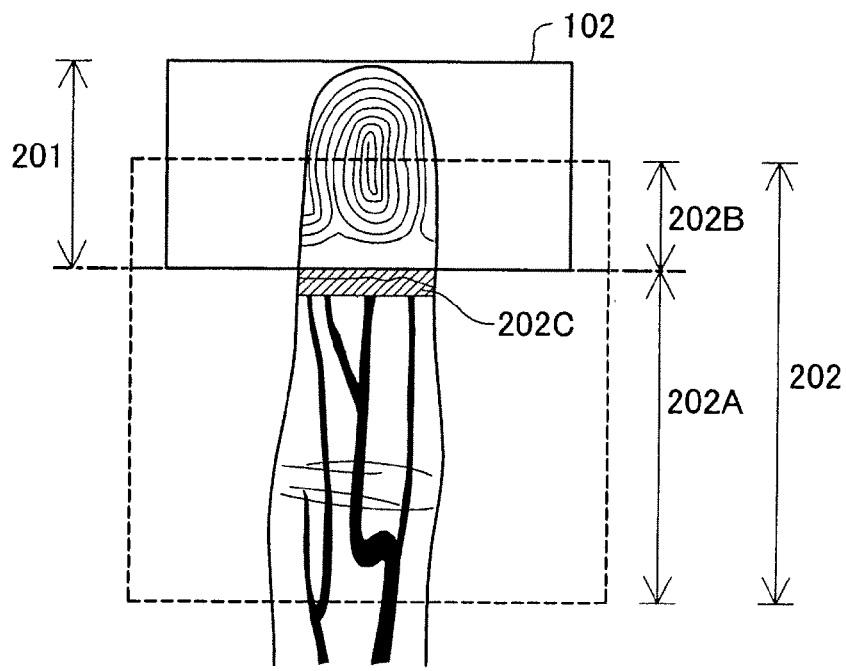
FIG. 18 is an explanatory diagrammatic representation of biological information obtained from a living finger.

FIG. 18 is an explanatory diagrammatic representation of biological information obtained from a living finger. Fingerprint is obtained from on a finger part that is in contact with a finger/palm print information acquisition unit 102. The vein information acquisition zone 202 is divided into the two areas, i.e. the first area 202A and the second area 202B as explained above. A boundary between the first area 202A and the second area 202B is specifically called a third area 202C. In this embodiment, the third area 202C represents a specific part of the first area 202A that is closest to and adjacent to the second area 202B.

Vein information obtained from the first area 202A through the third area 202C is explained below. A finger part corresponding to the second area 202B is pressed against the finger/palm print information acquisition unit 102 for acquisition of fingerprint. Inside this finger part corresponding to the second area 202B, blood vessels are compressed and the smooth blood flow is interrupted. Namely it is difficult to detect the veins in the second area 202B. There is a space between the finger and the first area 202A as mentioned above, so that inside a finger part corresponding to the first area 202A, blood vessels are not compressed and the smooth blood flow is not interrupted. This assures detection of the distinct and clear shape of the veins in the first area 202A. Inside a finger part corresponding to the third area 202C, blood vessels are slightly compressed and the smooth blood flow is slightly interrupted. The degree of the blood flow interruption in the third area 202C is lower than in the second area 202B. The detected shape of the veins is thus obscure and unclear in the third area 202C. Some location of the third area 202C may have no detection of the veins.

The clearness or unclearness of the detected shape of the veins may be determined by the following procedure. The controller 101 extracts characteristic points from a generated vein image. The characteristic points include, for example, a 'starting point' of each vein line, an 'end point' of each vein line, a 'branch point' of each vein line branching off to another vein line, and an 'intersection' of each vein line crossing another vein line. The characteristic points are readily extractable from a clear vein image but are not readily extractable from an unclear vein image. A large number of characteristic points are extractable from a clear vein image. The clearness or unclearness of the detected shape of the veins is thus determinable based on the number of extracted characteristic points and the time required for extraction of the characteristic points.

Figure 19:
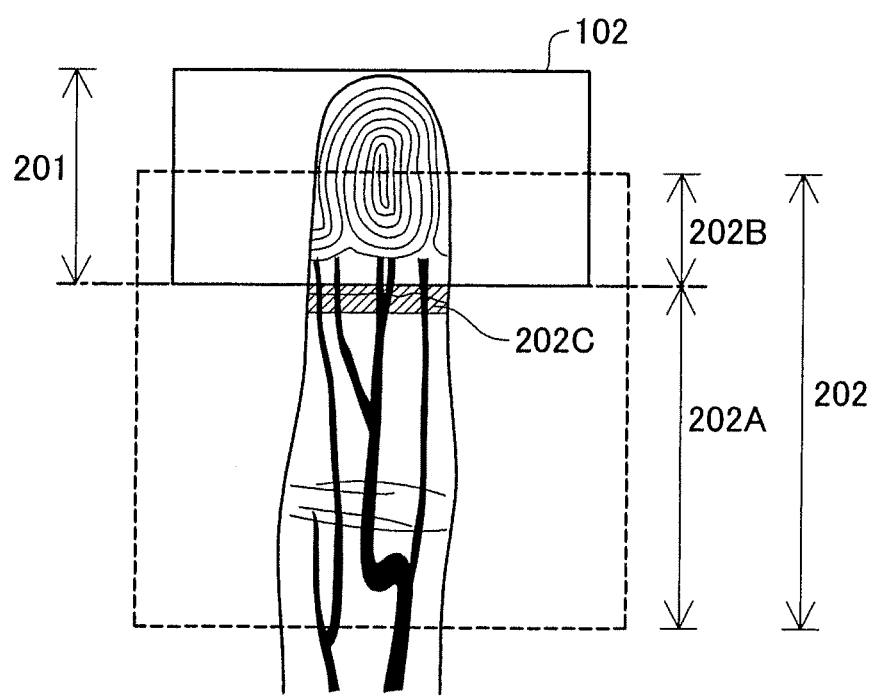
FIG. 19 is an explanatory diagrammatic representation of biological information obtained from a non-living, artificial finger.

FIG. 19 is an explanatory diagrammatic representation of biological information obtained from a non-living, artificial finger. In the specification hereof, information that does not derive from a living body but is obtained by the biometric authentication apparatus is also called biological information. In order to deceive vein authentication with a non-living, artificial finger, the shape of veins is imitated by a material that absorbs rays at the same wavelength as the absorption wavelength of blood flow in the veins. A typical fraud technique imitates the shape of veins in an artificial finger part corresponding to the first area 202A, while not imitating the shape of veins in an artificial finger part corresponding to the second area 202B. It is, however, difficult to imitate the shape of veins in an artificial finger part corresponding to the third area 202C. For example, when the fraud technique clearly forms the shape of veins in the third area 202C, the vein pattern expected to be unclear and obscure is clear and distinct in the third area 202C as shown in FIG. 19. The controller 101 (FIG. 3) is then allowed to verify that the finger placed in the biometric authentication apparatus is not a living finger but an artificial finger.

In the biometric authentication apparatus of the second embodiment, the controller 101 verifies the finger as a living finger, based on the clear and distinct vein information in the first area 202A and the unclear and obscure vein information in the third area 202C. The controller 101 verifies the finger as a non-living finger, on the other hand, based on the clear and distinct vein information in the first area 202A and the clear and distinct vein information in the third area 202C.

FIG. 20A-20C are explanatory diagrammatic representations of one modification of the second embodiment. A procedure of this modification moves the position of a finger and obtains vein information at two different positions. FIG. 20A shows biological information obtained at a first position. The first position in FIG. 20A is the same position as the position in FIG. 18, but this is only for convenience of illustration. The first position may be different from the position in FIG. 18. The third area 202C of FIG. 18 has the unclear shape of veins. The unclear and obscure shape of veins in the third area 202C is a necessary condition for verifying the finger placed in the biometric authentication apparatus as a living finger, but is not a sufficient condition. When a finger part 203 of an artificial finger corresponding to the third area 202C has unclear and obscure imitated shape of veins, the controller 101 may mistakenly verify the artificial finger as a living finger.

FIGS. 20B and 20C show biological information obtained at a second position. The biological information of FIG. 20B is obtained from a living finger, whereas the biological information of FIG. 20C is obtained from a non-living, artificial finger. The second position is lower than the first position along a longitudinal axis of a finger and is apart from the first position by at least a predetermined distance. As clearly understood from the comparison of FIGS. 20A through 20C, the finger part 203 has the clear and distinct shape of veins in FIG. 20B but has the unclear and obscure shape of veins in FIGS. 20A and 20C. The vein pattern of FIG. 20A alone is not sufficient to clarify the reason why the finger part 203 has the unclear and obscure shape of veins. The comparison with the clearness of the shape of veins in the finger part 203 at the second position shown in FIG. 20B or FIG. 20C clearly shows the reason why the finger part 203 has the unclear and obscure shape of veins.

The unclear and obscure shape of veins in the finger part 203 at the first position shown in FIG. 20A is changed to the clear and distinct shape of veins at the second position shown in FIG. 20B. In the state of FIG. 20A, the finger part 203 is located in the third area 202C where the blood vessels are compressed and the smooth blood flow is interrupted. In the state of FIG. 20B, the finger part 203 is released from the pressure against the finger/palm print information acquisition unit 102. Namely the blood vessels are not compressed, and the smooth blood flow is not interrupted inside the finger part 203. The smooth blood flow makes the shape of veins clear and distinct. This means that the finger placed in the biometric authentication apparatus is verified as a living finger.

The unclear and obscure shape of veins in the finger part 203 at the first position shown in FIG. 20A is unchanged at the second position shown in FIG. 20C. In the state of FIG. 20C, the finger part 203 is apart from the third area 202C and is thus not pressed. Namely the blood vessels are not compressed, and the smooth blood flow is not interrupted inside the finger part 203. The shape of veins in the finger part 203 deriving from a living body is expected to have the increased clearness. The unclear and obscure shape of veins proves that the finger part 203 originally has no blood flow. This means that the finger placed in the biometric authentication apparatus is verified as a non-living, artificial finger.

In the structure of the second embodiment, there is an extremely low but still certain probability of mistakenly verifying a highly sophisticated artificial finger as a living finger when the artificial finger is placed in the biometric authentication apparatus with extreme care. In the structure of this modification, on the other hand, the vein information acquisition unit 130 obtains the vein information in the third area 202C at the first position and the vein information in the first area 202A at the second position, which is lower than the first position along the longitudinal axis of the finger. The controller 101 verifies the finger inserted into the biometric authentication apparatus as a living finger, based on the unclear and obscure vein information in the third area 202C obtained at the first position and the clear and distinct vein information of the finger part 203 as part of the vein information in the first area 202A obtained at the second position. The controller 101 verifies the finger inserted into the biometric authentication apparatus as a non-living finger, based on the unclear and obscure vein information in the third area 202C obtained at the first position and the unclear and obscure vein information of the finger part 203 as part of the vein information in the first area 202A obtained at the second position.

In this modification, the second position of the finger is lower than the first position of the finger along the longitudinal axis of the finger. This is, however, not essential. As long as the first position and the second position are apart from each other by at least a predetermined distance, the positional relation of these two positions may be set arbitrarily.

Figure 21:
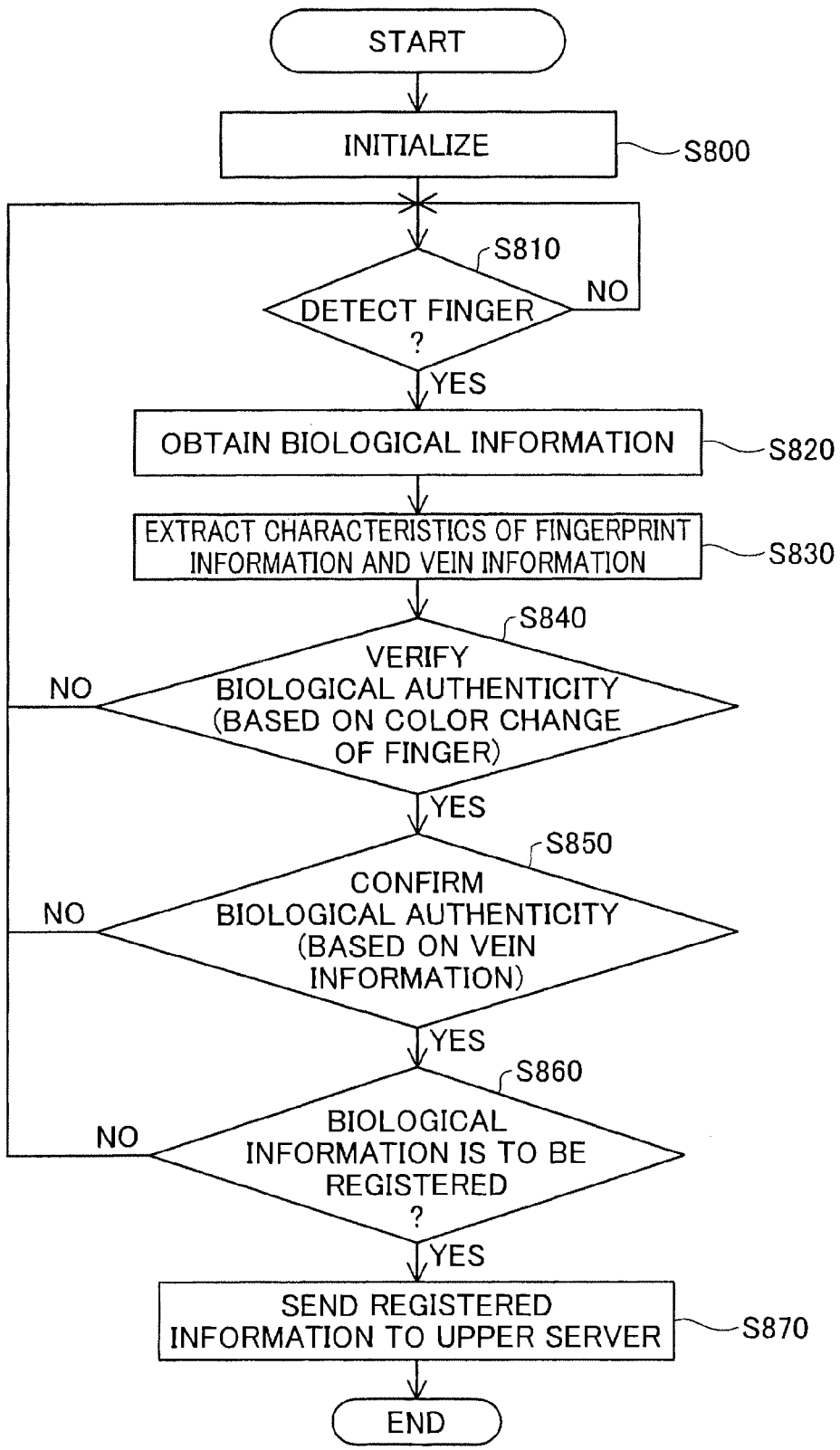
FIG. 21 is a flowchart showing a biological information registration process in one embodiment of the invention.

FIG. 21 is a flowchart showing a biological information registration process in one embodiment of the invention. After the power supply, the ATM 100 initializes the biological information acquisition assembly 200 or the biometric authentication apparatus at step S800. The biological information acquisition assembly 200 in the initial state waits for insertion of a finger therein. In response to detection of an inserted finger at step S810, the biological information acquisition assembly 200 shifts the processing flow to step S820. The means for detecting the inserted finger include, for example, the fingertip detection sensor 104 and the finger base detection sensor 105.

At step S820, the finger/palm print information acquisition unit 102 and the vein information acquisition unit 130 capture the inserted finger to respectively generate a fingerprint image and a vein image. The fingerprint image and the vein image are generated by the same procedure as that of the first embodiment described above. At step S830, the controller 101 extracts characteristics of fingerprint information and vein information, which are usable for the subsequent user authentication, user registration, and verification of biological authenticity, from the generated fingerprint image and vein image.

The inserted finger is verified as a living finger or a non-living finger, based on a color change of the finger at step S840. More specifically, a color change of the finger pressed against the protective film 102f is captured and detected by the camera 150. A living finger pressed against the protective film 102f generally has a decreasing blood flow and a resulting less reddishness. Based on detection of such a color change, the controller 101 primarily verifies whether the inserted finger is a living finger or a non-living finger. Upon verification of the inserted finger as a non-living finger at step S840, the controller 101 returns the processing flow to step S810 to wait for insertion of another finger. The controller 101 may skip the processing of step S840 according to the requirements.

Upon primary verification of the inserted finger as a living finger at step S840, on the other hand, the controller 101 refers to the vein information and confirms whether the inserted finger is a living finger or non-living finger at step S850. The controller 101 may perform the confirmation of the biological authenticity according to the method of the second embodiment or the method of its modification described above. Upon confirmation of the inserted finger as a non-living finger at step S850, the controller 101 returns the processing flow to step S810 to wait for insertion of another finger.

Upon confirmation of the inserted finger as a living finger at step S850, on the other hand, the controller 101 registers the obtained fingerprint information and vein information into the biological information storage module 113 (FIG. 2) at step S860. The controller 101 also sends the obtained fingerprint information and vein information to an upper server (not shown) at step S870. The fingerprint information and the vein information may be sent to a separate ATM and utilized for user authentication at the separate ATM.

Figure 22:
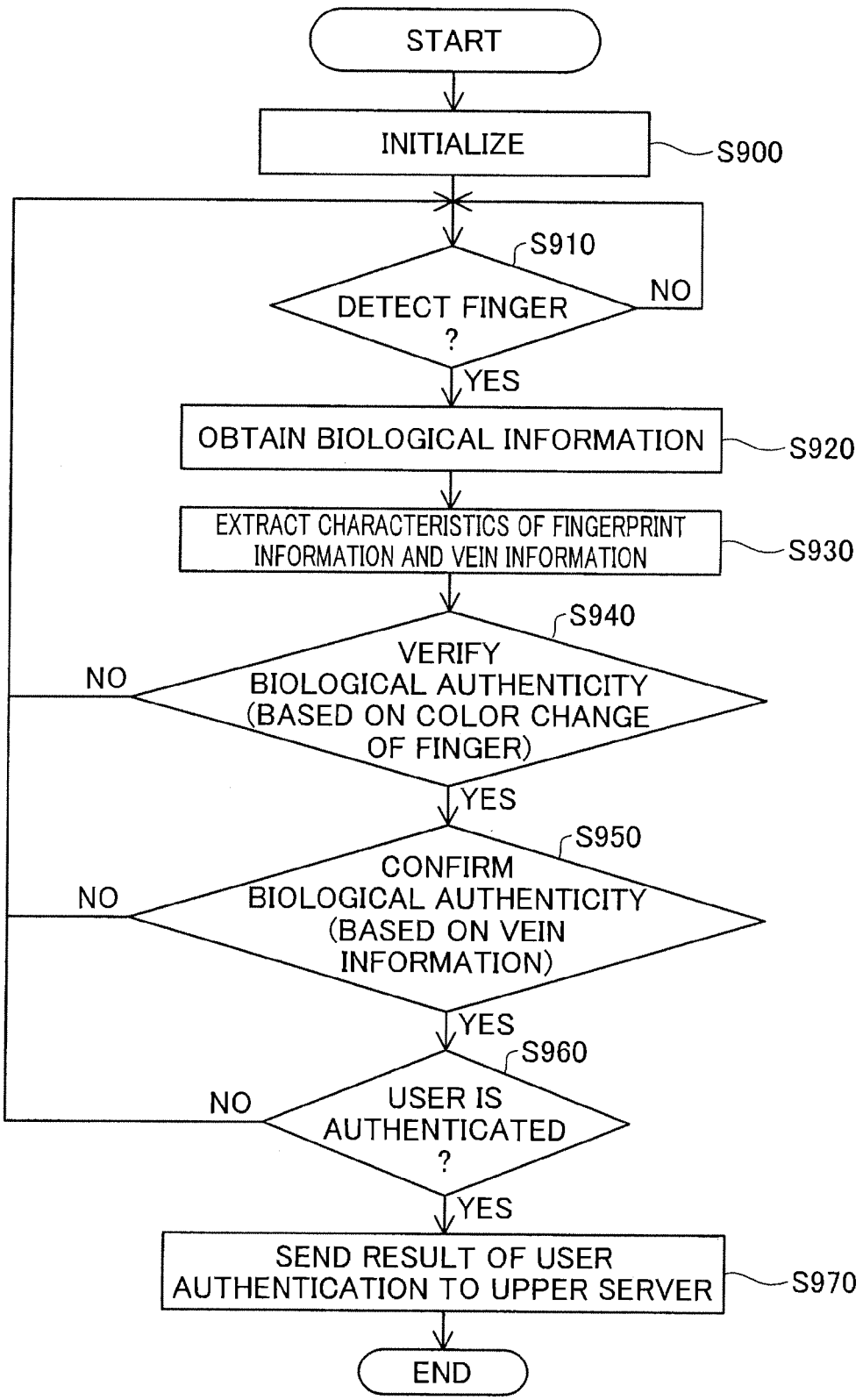
FIG. 22 is a flowchart showing a user authentication process in one embodiment of the invention.

FIG. 22 is a flowchart showing a user authentication process in one embodiment of the invention. The flowchart of FIG. 22 is similar to the flowchart of FIG. 21, except the processing of steps S960 and S970, which are explained below. The respective steps in the flowchart of FIG. 22 are shown by step numbers starting from a digit 'S9' with addition of '100' to step numbers starting from a digit 'S8' in the flowchart of FIG. 21.

The controller 101 authenticates the user at step S960. More specifically, the controller 101 compares characteristic points of fingerprint information and vein information extracted at step S930 with characteristic points of fingerprint information and vein information registered in advance in the biological information storage module 113 and determines whether there is a matching registry with the fingerprint information and the vein information obtained at step S930. When there is a matching registry, the identification of the matching registry is made.

The controller 101 sends the result of the user authentication to an upper server at step S970. When there are a large number of registries of fingerprint information and vein information, it is practically impossible to manage the registries of fingerprint information and vein information in each ATM. In one modification, instead of the user authentication at step S960 in the flowchart of FIG. 22, the controller 101 may send the characteristics of the fingerprint information and the vein information extracted at step S930 to an upper server, which authenticates the user based on the received information, and receive a result of the user authentication from the upper server. This modified flow does not require the processing of step S970, since the upper server naturally has the result of the user authentication.

As described above, the controller 101 verifies and confirms whether the detected finger is a living finger or a non-living finger (steps S840 and S850) in the course of registration of the fingerprint information and the vein information. The biometric authentication is generally implemented by comparison between the registry of fingerprint information and vein information and the extracted fingerprint information and vein information for authentication. The verification of the biological authenticity of the finger as a living finger or a non-living finger in the course of information registration is essential to prevent a fraud of registering deceived information, such as information of an artificial finger, as authorized information into the biological information storage module 113. Once such fraud registry is accepted, illegal authentication may be made with the same artificial finger. The procedure of this embodiment verifies and confirms whether the detected finger is a living finger or a non-living finger in the course of registration. This arrangement effectively prevents registration of deceived information, such as information of an artificial finger.

The verification and the confirmation of the detected finger as a living finger or a non-living finger (steps S840 and S850) may be performed simultaneously with acquisition of the biological information (fingerprint information and vein information (step S820). The finger/palm print information acquisition unit 102 obtains the fingerprint information when the finger is pressed against the protective film 102f. For example, at this timing, the camera 150 may simultaneously work to capture a color change of the finger. In another example, the vein information acquisition unit 130 may separately obtain the vein information in the first through the third areas 202A through 202C. This arrangement allows for acquisition of vein information simultaneously with verification of the detected finger as a living finger or a non-living finger based on the obtained vein information. The acquisition of information simultaneously with verification of the biological authenticity may be performed in the course of registration or in the course of user authentication.

The procedure of this embodiment obtains the fingerprint information and the vein information when the finger is pressed against the protective film 102f. The magnitude of the pressure on the finger pressed against the protective film 102f is detectable by the fingertip detection sensor 104. The size of the third area 202C may be varied according to the detected magnitude of the pressure. In the finger under the larger pressure, the blood vessels are more compressed, so that the unclear and obscure vein detection area is widened. The third area 202C may thus be extended with an increase in pressure detected by the fingertip detection sensor 104.

The modification of the second embodiment changes the position of the finger as described above. Alternatively the pressure on the finger pressed against the protective film 102 may be changed. A living finger generally has a variation in size of the unclear and obscure vein detection area with a pressure change. The controller 101 may thus verify whether the finger is a living finger or a non-living finger, based on a variation in size of the unclear and obscure vein detection area with a pressure change.

The invention may be actualized by any of diverse applications, embodiments, and arrangements other than those described above, for example, a biometric authentication method, computer programs for implementing the functions of either the biometric authentication method or the biometric authentication apparatus, and recording media in which such computer programs are recorded. The biometric authentication apparatus of the invention may be used in combination with one or multiple other appropriate members.

What is claimed is:

1. A biometric authentication apparatus for performing user authentication based on finger/palm print information representing a biological characteristic of fingerprint or palm print and vein information representing a biological characteristic of vein, comprising:
   a finger/palm print information acquirer configured to obtain finger/palm print information from a selected portion of a person;
   a vein information acquirer configured to obtain vein information from the selected portion of the person;
   a sensor configured to come in contact with the selected portion of the person and to output a signal corresponding to a pressing degree of the selected portion of the person against the sensor;
   a controller configured to identify, responsive to the signal output from the sensor, whether a state of the selected portion of the person is suitable for obtaining the finger/palm print information and the vein information and to control the finger/palm print information acquirer and the vein information acquirer to obtain the finger/palm print information and the vein information according to a result of the identification; and
   a user authenticator configured to perform user authentication based on the finger/palm print information and the vein information;
   wherein the controller is configured to identify that the state of the selected portion of the person is suitable for obtaining the finger/palm print information when the pressing degree of the selected portion of the person is higher than a first predetermined level, while identifying that the state of the selected portion of the person is suitable for obtaining the vein information when the pressing degree of the selected portion of the person is lower than a second predetermined level that is equal to or lower than the first predetermined level.

2. The biometric authentication apparatus in accordance with claim 1, wherein the controller is configured to identify that the state of the selected portion of the person is suitable for obtaining second vein information when the pressing degree of the selected portion of the person is higher than the first predetermined level.

3. The biometric authentication apparatus in accordance with claim 2, wherein the controller is configured to compare the first vein information with the second vein information and thereby to verify whether the selected portion of the person, from which the first vein information and the second vein information are obtained, is a living biological origin or a non-living or non-biological origin.

4. The biometric authentication apparatus in accordance with claim 1, further comprising:
   a notifier configured to inform a user of an operation guide, wherein upon identification that the state of the selected portion of the person is not suitable for obtaining the finger/palm print information or the vein information, the controller is configured to control the notifier to inform the user of an operation guide for changing the state of the selected portion of the person to be suitable for obtaining the finger/palm print information or the vein information.

5. A biometric authentication method of performing user authentication using a biometric authentication apparatus having a finger/palm print information acquirer configured to obtain finger/palm print information representing a biological characteristic of fingerprint or palm print from a selected portion of a person and a vein information acquirer configured to obtain vein information representing a biological characteristic of vein from the selected portion of the person, the biometric authentication method comprising:
   outputting a signal corresponding to a pressing degree of the selected portion of the person;
   identifying, responsive to the signal output from a sensor, whether a state of the selected portion of the person is suitable for obtaining the finger/palm print information and the vein information and controlling the finger/palm print information acquirer and the vein information acquirer to obtain the finger/palm print information and the vein information according to a result of the identification; and
   performing user authentication based on the finger/palm print information and the vein information;
   wherein the identifying includes identifying that the state of the selected portion of the person is suitable for obtaining the finger/palm print information when the pressing degree of the selected portion of the person is higher than a first predetermined level, while identifying that the state of the selected portion of the person is suitable for obtaining the vein information when the pressing degree of the selected portion of the person is lower than a second predetermined level that is equal to or lower than the first predetermined level.

6. A biometric authentication apparatus for performing user authentication based on finger/palm print information representing a biological characteristic of fingerprint or palm print and vein information representing a biological characteristic of vein, comprising:
   a finger/palm print information acquirer configured to obtain finger/palm print information from a selected portion of a person;
   a vein information acquirer configured to obtain vein information from the selected portion of the person;
   a sensor configured to come in contact with the selected portion of the person and to output a signal corresponding to a pressing degree of the selected portion of the person against the sensor;
   a controller configured to identify, responsive to the signal output from the sensor, whether a state of the selected portion of the person is suitable for obtaining the finger/palm print information and the vein information and to control the finger/palm print information acquirer and the vein information acquirer to obtain the finger/palm print information and the vein information according to a result of the identification; and
   a user authenticator configured to perform user authentication based on the finger/palm print information and the vein information;
   wherein
      the finger/palm print information acquirer has a mounting surface on which the selected portion of the person is placed,
      the vein information acquirer has a first zone arranged to have a step relative to the mounting surface of the finger/palm print information acquirer and a second zone arranged at an identical height with a height of the mounting surface,
      while the selected portion of the person is stationary on the mounting surface of the finger/palm print information acquirer, the vein information acquirer is configured to obtain first vein information in the first zone and second vein information in an adjacent area close to a boundary between the first zone and the second zone, as the vein information, and
      the user authenticator is configured to perform a first verification process of verifying the selected portion of the person as a living biological origin when the first vein information is clear and distinct and the second vein information is unclear and obscure, while verifying the selected portion of the person as a non-living or non-biological origin when the first vein information and the second vein information are both clear and distinct.

7. The biometric authentication apparatus in accordance with claim 6, wherein the vein information acquirer is configured to obtain both the first vein information and the second vein information from the selected portion of the person located at a first position on the mounting surface and from the selected portion of the person located at a second position apart from the first position by at least a predetermined distance on the mounting surface, the user authenticator is configured to perform a second verification process even when the selected portion of the person is verified as a living biological origin in the first verification process, and the second verification process performed by the user authenticator verifies the selected portion of the person as a living biological origin when the second vein information obtained at the first position is unclear and obscure and when a specific part of the first vein information obtained at the second position, which corresponds to a specific area of the selected portion of the person from which the second vein information is obtained at the first position, is clear and distinct, the second verification process verifies the selected portion of the person as a non-living or non-biological origin when the second vein information obtained at the first position is unclear and obscure and when the specific part of the first vein information obtained at the second position, which corresponds to the specific area of the selected portion of the person from which the second vein information is obtained at the first position, is unclear and obscure.

8. The biometric authentication apparatus in accordance with claim 6, wherein the vein information acquirer is configured to change a size of the adjacent area close to the boundary between the first zone and the second zone for obtaining the second vein information with a variation in level of the output signal from the sensor, such that the adjacent area is extended to be wider with an increase in pressing degree of the selected portion of the person.

9. The biometric authentication apparatus in accordance with claim 7, wherein the vein information acquirer is configured to change a size of the adjacent area close to the boundary between the first zone and the second zone for obtaining the second vein information with a variation in level of the output signal from the sensor, such that the adjacent area is extended to be wider with an increase in pressing degree of the selected portion of the person.

* * * * *